(12) United States Patent
Chen et al.

(10) Patent No.: US 8,521,843 B2
(45) Date of Patent: Aug. 27, 2013

(54) METHODS AND APPARATUS FOR SAMPLING USAGE INFORMATION FROM A POOL OF TERMINALS IN A DATA NETWORK

(75) Inventors: An Mei Chen, San Diego, CA (US); Qiang Gao, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 356 days.

(21) Appl. No.: 12/057,026

(22) Filed: Mar. 27, 2008

(65) Prior Publication Data

US 2008/0270598 A1    Oct. 30, 2008

Related U.S. Application Data

(63) Continuation-in-part of application No. 11/491,472, filed on Jul. 21, 2006, now Pat. No. 7,783,748.

(60) Provisional application No. 60/808,615, filed on May 25, 2006.

(51) Int. Cl.
*G06F 13/00* (2006.01)

(52) U.S. Cl.
USPC ............ 709/219; 709/224; 709/227; 709/250

(58) Field of Classification Search
USPC .................. 709/217, 219, 223, 224, 227, 250
See application file for complete search history.

(56) References Cited

U.S. PATENT DOCUMENTS

| 6,529,515 | B1 | 3/2003 | Raz et al. |
| 7,032,229 | B1 | 4/2006 | Flores et al. |
| 7,089,304 | B2 | 8/2006 | Graham |
| 7,093,250 | B1 | 8/2006 | Rector |
| 7,215,648 | B2 * | 5/2007 | Sullivan ........................ 370/278 |
| 7,262,357 | B2 | 8/2007 | Plastina et al. |

(Continued)

FOREIGN PATENT DOCUMENTS

| EP | 0977389 | 2/2000 |
| JP | 11355229 | 12/1999 |

(Continued)

OTHER PUBLICATIONS

Written Opinion, PCT/US07/069782, International Search Authority, European Patent Office, Nov. 8, 2007.

(Continued)

*Primary Examiner* — Viet Vu
(74) *Attorney, Agent, or Firm* — The Marbury Law Group, PLLC

(57) ABSTRACT

Methods and apparatus for sampling usage information from a pool of terminals in a data network. In an aspect, a method is provided that includes determining a designated set of terminals, and transmitting tracking parameters to the designated set of terminals, wherein the tracking parameters identify at least one upload window. In an aspect, an apparatus is provided that includes provisioning logic configured to determine one or more tracking parameters that identify at least one upload window, and targeting logic configured to determine a designated set of terminals, and to transmit tracking parameters to the designated set of terminals. In another aspect, a method is provided for performing usage tracking. The method includes receiving tracking parameters that identify at least one upload window, performing usage tracking according to the tracking parameters to produce a tracking log, and transmitting the tracking log during the at least one upload window.

145 Claims, 12 Drawing Sheets

(56) References Cited

U.S. PATENT DOCUMENTS

| | | |
|---|---|---|
| 7,281,045 B2 | 10/2007 | Aggarwal et al. |
| 7,310,511 B2 | 12/2007 | Barnea et al. |
| 7,343,390 B2 | 3/2008 | Cohen et al. |
| 7,376,654 B1 | 5/2008 | Chau et al. |
| 7,376,722 B1 | 5/2008 | Sim et al. |
| 7,451,209 B1 | 11/2008 | Schieber et al. |
| 7,454,503 B2 | 11/2008 | Childress et al. |
| 7,783,748 B2 | 8/2010 | Chen et al. |
| 8,239,521 B2 | 8/2012 | Curcio et al. |
| 2003/0079218 A1* | 4/2003 | Goldberg et al. ............... 725/13 |
| 2003/0188171 A1 | 10/2003 | DeCenzo et al. |
| 2004/0153767 A1* | 8/2004 | Dolgonos ....................... 714/18 |
| 2004/0209595 A1 | 10/2004 | Bekanich |
| 2005/0172786 A1 | 8/2005 | Plastina et al. |
| 2005/0246439 A1 | 11/2005 | Fong et al. |
| 2005/0262235 A1 | 11/2005 | Childress et al. |
| 2005/0262245 A1 | 11/2005 | Menon et al. |
| 2006/0007901 A1 | 1/2006 | Roskowski et al. |
| 2006/0040642 A1 | 2/2006 | Boris et al. |
| 2006/0047813 A1 | 3/2006 | Aggarwal et al. |
| 2006/0074952 A1 | 4/2006 | Rothman et al. |
| 2006/0101224 A1 | 5/2006 | Shah et al. |
| 2006/0218533 A1 | 9/2006 | Koduru et al. |
| 2006/0259328 A1 | 11/2006 | Burd et al. |
| 2007/0081543 A1 | 4/2007 | Brenes et al. |
| 2007/0261072 A1 | 11/2007 | Boulet et al. |
| 2008/0270598 A1 | 10/2008 | Chen et al. |
| 2009/0133025 A1 | 5/2009 | Malhotra et al. |

FOREIGN PATENT DOCUMENTS

| | | |
|---|---|---|
| JP | 2008512047 T | 4/2008 |
| KR | 20070112412 A | 11/2007 |
| TW | 545019 B | 8/2003 |
| WO | WO 01/11506 A1 | 2/2001 |
| WO | 03079588 | 9/2003 |
| WO | 2006099586 | 9/2006 |
| WO | 2007140326 | 12/2007 |

OTHER PUBLICATIONS

International Preliminary Report on Patentability, PCT/US07/069782, International Preliminary Examining Authority, United States, Nov. 28, 2008.

International Search Report/ Written Opinion issued in PCT/US2007/069782 on Nov. 8, 2007.

International Search Report, PCT/US2009/036352, International Searching Authority, European Patent Office, Sep. 8, 2009.

Written Opinion PCT/US2009/036352, International Searching Authority, European Patent Office, Sep. 8, 2009.

International Preliminary Report On Patentability, PCT/US2009/036352, International Preliminary Examining Authority, European Patent Office, Jun. 2, 2010.

Search Report, ROC (Taiwan) Patent Application No. 096118578, Jun. 7, 2010.

Search Report—ROC (Taiwan) Patent Application No. 096118578 (Translation), Jun. 7, 2010.

The International Bureau of WIPO, "International Preliminary Report on Patentability—PCT/US2009/067692," Nov. 30, 2010.

\* cited by examiner

METHODS AND APPARATUS FOR SAMPLING USAGE INFORMATION FROM A POOL OF TERMINALS IN A DATA NETWORK

CLAIM OF PRIORITY UNDER 35 U.S.C. §120

The present Application for Patent is a Continuation-in-Part of and claims priority to patent application Ser. No. 11/491,472, entitled "METHODS AND APPARATUS FOR SAMPLING USAGE INFORMATION FROM A POOL OF TERMINALS IN A DATA NETWORK, filed Jul. 21, 2006, now U.S. Pat. No. 7,783,748, and claims the benefit of priority to U.S. Provisional Patent Application No. 60/808,615, filed May 25, 2006, both assigned to the assignee hereof and hereby expressly incorporated by reference herein.

BACKGROUND

I. Field

The present invention relates generally to information tracking in a network environment, and more particularly, to methods and apparatus for sampling usage information from a pool of terminals in a data network.

II. Description of the Related Art

Data networks, such as wireless communication networks, have to trade off between services customized for a single terminal and services provided to a large number of terminals. The distribution of content (data) to a large number of terminals (subscribers) is a complicated problem. Therefore, it is very important for network administrators and content providers to understand how well services are being provided over the network and how terminal users are utilizing the provided services.

Typically, network tracking systems monitor terminal interaction with a network server. For example, terminal users may contact the server to download applications, make content selections, answer survey questions, or to request any other type of service. The server may then track these requests to monitor what services are being delivered to users and to get some idea of user satisfaction from survey results.

Unfortunately, monitoring terminal usage at the server from terminal requests may not be very accurate and does not provide all the information that network administrators and content providers would like to have. For example, the server is limited to obtaining information from only those terminals that contact the server, and so information about non-requesting terminals may not be obtained. Additionally, the types of information that can be obtained may be limited. For example, the server may be able to determine what content is being delivered, but may not be able to determine how efficiently the content was delivered or how the content is being used at the terminal. Furthermore, current systems may not be able to gather information from the same terminals over a selected time period so that historical data can be assembled. Finally, the system may not protect the identity of the terminals it monitors so that the privacy of the terminal user may be at risk.

Therefore, what is needed is a usage tracking system for use in network environments that operates to track how well services are provided to one or more terminals and to monitor how terminal users utilized those services, so that network administrators and content providers can understand how such services may be improved. The system should operate to allow tracking of targeted groups of terminals so that historical usage data can be easily obtained. The system should also operate to protect the identity of the terminals and their users so that user privacy is maintained.

SUMMARY

In one or more embodiments, a usage tracking system, comprising methods and apparatus, is provided that operates to efficiently track usage information pertaining to one or more terminals (or devices) in a data network.

In an aspect, a method is provided for performing usage tracking. The method comprises determining a designated set of terminals, and transmitting tracking parameters to the designated set of terminals, wherein the tracking parameters identify at least one upload window.

In an aspect, an apparatus is provided for performing usage tracking. The apparatus comprises provisioning logic configured to determine one or more tracking parameters that identify at least one upload window, and targeting logic configured to determine a designated set of terminals, and to transmit tracking parameters to the designated set of terminals.

In an aspect, an apparatus is provided for performing usage tracking. The apparatus comprises means for determining a designated set of terminals, and means for transmitting tracking parameters to the designated set of terminals, wherein the tracking parameters identify at least one upload window.

In an aspect, a computer program product comprising a machine-readable medium is provided. The machine-readable medium comprises a first set of codes for causing a computer to determine a designated set of terminals, and a second set of codes for causing the computer to transmit tracking parameters to the designated set of terminals, wherein the tracking parameters identify at least one upload window.

In an aspect, an integrated circuit is provided that is configured to provide a method for usage tracking. The integrated circuit comprises a first module configured for determining a designated set of terminals, and a second module configured for transmitting tracking parameters to the designated set of terminals, wherein the tracking parameters identify at least one upload window.

In an aspect, a method is provided for performing usage tracking. The method comprises receiving tracking parameters that identify at least one upload window, performing usage tracking according to the tracking parameters to produce a tracking log, and transmitting the tracking log during the at least one upload window.

In an aspect, an apparatus is provided for performing usage tracking. The apparatus comprises receiving logic configured to receive tracking parameters that identify at least one upload window, processing logic configured to perform usage tracking according to the tracking parameters to produce a tracking log, and transmitting logic configured to transmit the tracking log during the at least one upload window.

In an aspect, an apparatus is provided for performing usage tracking. The apparatus comprises means for receiving tracking parameters that identify at least one upload window, means for performing usage tracking according to the tracking parameters to produce a tracking log, and means for transmitting the tracking log during the at least one upload window.

In an aspect, a computer program product is provided for usage tracking. The computer program product comprises a machine-readable medium that comprises a first set of codes for causing a computer to receive tracking parameters that identify at least one upload window. The machine-readable medium also comprises a second set of codes for causing the computer to perform usage tracking according to the tracking parameters to produce a tracking log, and a third set of codes for causing the computer to transmit the tracking log during the at least one upload window.

In an aspect, an integrated circuit is provided that is configured to provide a method for usage tracking. The integrated circuit comprises a first module configured for receiving tracking parameters that identify at least one upload window. The integrated circuit also comprises a second module configured for performing usage tracking according to the tracking parameters to produce a tracking log, and a third module configured for transmitting the tracking log during the at least one upload window.

Other aspects will become apparent after review of the hereinafter set forth Brief Description of the Drawings, Description, and the Claims.

BRIEF DESCRIPTION OF THE DRAWINGS

The foregoing aspects described herein will become more readily apparent by reference to the following Description when taken in conjunction with the accompanying drawings wherein.

DESCRIPTION

The following detailed description describes one or more embodiments of a usage tracking system that operates to efficiently track usage information pertaining to one or more terminals in a data network. The system is especially well suited for use in wireless networks environments, but may be used in any type of network environment, including but not limited to, communication networks, public networks, such as the Internet, private networks, such as virtual private networks (VPN), local area networks, wide area networks, long haul network, or any other type of data network.

In one or more embodiments, the usage tracking system operates to collect usage statistics from one or more terminals in a data network. A usage tracking server is provided that operates to collect the usage statistics and store these statistics into a usage tracking database. Once collected, the usage statistics can be used to produce reports, historical data, or other summary information that may be used by information servers, advertisers, network administrators, content providers, or any other entity that may require usage information in the data network.

Random Group Usage Tracking

Figure 1:
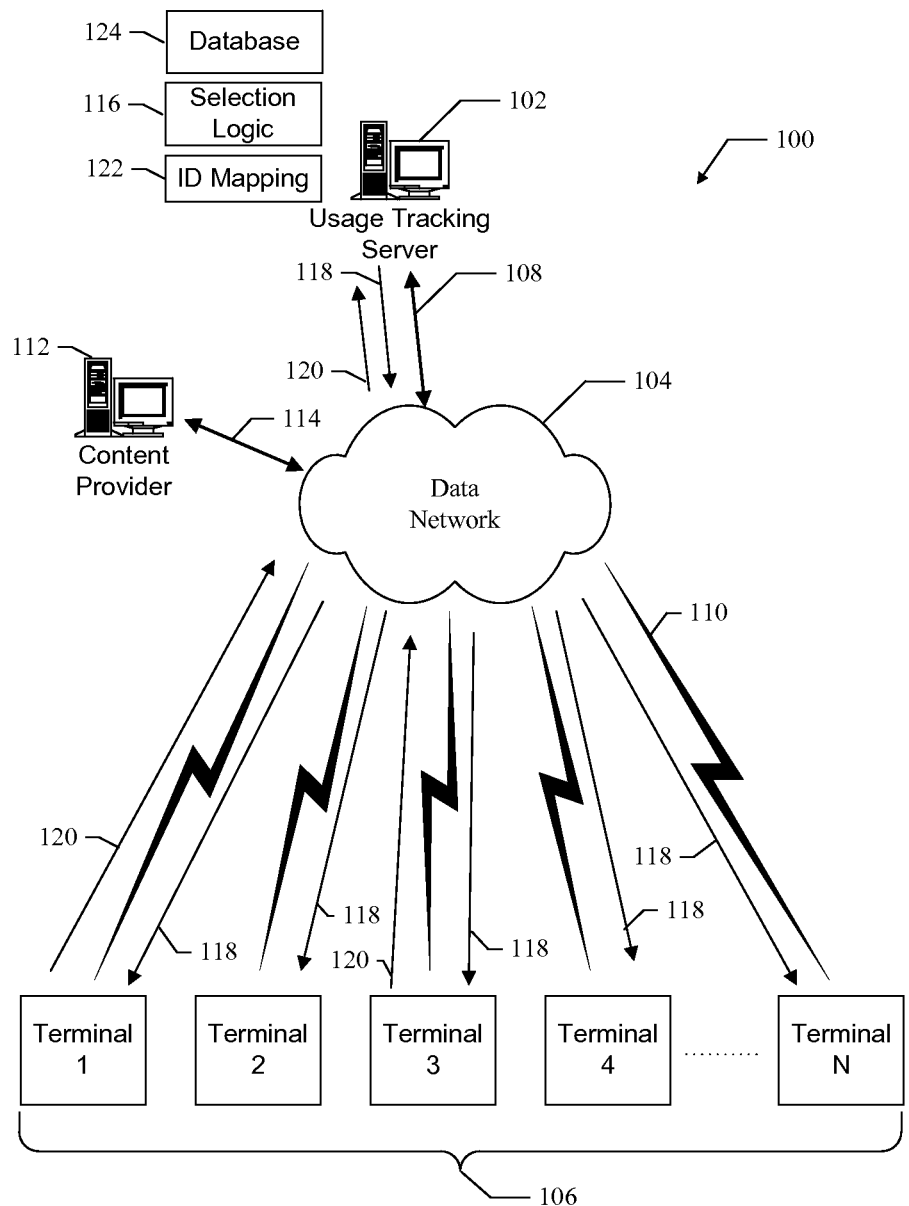
FIG. 1 shows a data network that comprises one embodiment of a usage tracking system.

FIG. 1 shows a data network 100 that comprises one embodiment of a usage tracking system. The network 100 comprises a usage tracking server 102, a data network 104, and a pool of terminals (1 thru N), as shown at 106. The data network 104 may be any type and/or combination of wired and/or wireless networks that allow data to be transmitted between the server 102 and the terminals 106. The server 102 communicates with the network 104 via the communication channel 108. The communication channel 108 may be any type of wired or wireless communication channel that allows the server 102 to communicate over the data network 104. The data network 104 provides communication with the terminals 106 via wireless communication links 110 that allow data to be wirelessly transmitted between the network 104 and the terminals 106. In one embodiment, the wireless communication links 110 comprise forward communication channels, reverse communication channels, control channels, and/or any other type of communication channel that may be used to communicate information between the network 104 and the terminals 106.

The network 100 also includes a content provider 112 that operates to provide content to entities in communication with the network 104, such as the terminals 106. For example, the content provider 112 communicates with the network 104 via the link 114 to provide applications, programs, multimedia content, or any other type of content and/or data for use by the terminals 106

The usage tracking server 102 comprises selection logic 116 that operates to select one or more of the terminals 106 for usage tracking. For example, the selection logic 116 selects a targeted set of terminals from the pool of terminals 106 and those targeted terminals will perform usage tracking based on parameters provided by the usage tracking server 102. For example, the server 102 transmits usage tracking parameters to all terminals of the pool of terminals 106, as shown at 118. Each of the terminals 106 processes the tracking parameters to determine if it is a targeted terminal and required to perform usage tracking. For example, in one embodiment, the tracking parameters include a sampling percentage or fraction indicator that specifies a response range. If a random number generated at each terminal is within the response range, then that terminal is a targeted terminal and performs usage tracking according to the tracking parameters. For example, in FIG. 1, all the terminals 106 receive the tracking parameters but only terminals 1 and 3 determine that they are targeted terminals and are required to perform usage-tracking. After the terminals 1 and 3 perform usage tracking according to the received usage tracking parameters, they transmit usage tracking data to the server 102, as shown at 120.

The server 102 also comprises identity (ID) mapping logic 122 that operates to map the identity of responding terminals (i.e., the terminals 1 and 3) so that the privacy of the usage tracking data they provide will be protected. For example, the mapping logic 122 associates the usage tracking data with device log identifiers that do not directly identify the source of the usage tracking data. The usage tracking data and device log identifiers are then stored in a usage tracking database 124. By storing the usage tracking data in the database 124, it is possible for the server 102 to construct a usage tracking history for any of the terminals 106.

Thus, in one or more embodiments, the usage tracking system operates to track the usage of one or more terminals in a data network. The resulting usage database may be used to generate reports for a variety of network entities, such as the content provider 112 and/or network administrators, advertisers, and any other entity interested in the operation of the network and/or the terminals 106.

An overview of the types of functions and information that may be collected during operation of the usage tracking system is provided in the following sections. However, it should be noted that the described information is intended to be illustrative and not limiting of the types of information that may be tracked and collected by the system. Thus, the system may operate to collect virtually any type of information available at a terminal device.

Usage Statistics The usage tracking system can be used to collect various usage statistics, such as information about presentations viewed by the user of the terminal, the viewing duration of those presentations, or any other information. The usage tracking system can also be used to collect statistical information that can be used for optimizing any type of network services.

Statistical Sampling The usage tracking system can operate using statistical sampling. For example, any percentage of the terminal population (targeted terminals) may be selected to log and return usage tracking data. Terminals may be selected randomly or by the use of any type of selection algorithm so that any type of probability sampling method may be implemented to select terminals to log usage data.

User Anonymity The usage tracking system operates to ensure the privacy of the usage tracking data that is collected. For example, usage tracking data may be stored in an anonymous manner to protect the identity of the logging device and its user. In one embodiment, a terminal sends the logged usage data to a usage server in an identifiable manner. However, the usage server operates to generate a unique device log identifier from the terminal identifier to protect the identity of the terminal. For example, in one embodiment, a hashing algorithm is used to generate the unique device log identifier from the actual terminal identifier. Thus, it is computationally infeasible to determine the terminal identification from the unique device log identifier. The received tracking data is then stored along with the unique device log identifier in a database, and as a result, the data is not traceable to any particular terminal or user.

Enable/Disable The usage tracking system operates so that terminals log usage data within selected logging windows. In one embodiment, the usage tracking system provides usage tracking parameters to the terminals to indicate when a terminal should initiate logging of usage data, the duration of the logging, etc. Once the logging window expires the terminal discontinues logging usage data. The terminal may also be instructed to discontinue logging before the logging window expires.

Usage Tracking Parameters

The usage tracking server conveys the usage tracking parameters to the terminals through an overhead notification mechanism. For example, the overhead notification mechanism may comprise a control channel that allows the usage server to communicate control information to the terminals. However, in one or more embodiments, the overhead notification mechanism may be any type of in-band or out-of-band communication channel between the usage tracking server and the terminals.

The usage tracking parameters are sent using the overhead notification mechanism and indicate to the terminal when it should initiate logging, duration of the logging, events, states to be logged, etc. The logging events or logging states determine what kind of usage data is to be logged. For example, logging events like a presentation viewing event indicate that data should be capture that describes how many times the user views a presentation, when the user views the presentations and so on. The logging event/state can be independently enabled or disabled through a logging mask.

The overhead notification mechanism carries the usage tracking parameters to each terminal. For example, the following is a sample list of parameters that may be sent to each terminal using the overhead notification mechanism. It should be noted that the following list is not exhaustive and that it is possible to send virtually any type of parameter to the terminals to control the data logging operation.

1. Logging Start time Indicates when a terminal should commence the logging function.
2. Logging Window Indicates the duration of the logging function.
3. Logging Mask Indicates the Logging Events and States to be logged. Each Logging Event and State can be independently enabled or disabled through the logging mask.
4. Sampling Percentage Indicates the percentage of the terminals that are required to log data. Sampling Percentage is used as a reference by the terminal to determine whether it should initiate logging or not. For example, if the sampling percentage or fraction is set to ten, approximately 10% of the terminals will log usage data. For example, in one embodiment, the terminals generate a random number uniformly distributed between 1 and 100. A terminal will only initiate the logging function if the random number generated is less than or equal to the sampling percentage (i.e., 10).
5. Seed A Seed can be used to target the same as well as a different set of terminals to log usage information. In one embodiment, each terminal uses an exclusive-OR (EXOR) function to combine the Seed with the electronic serial number (ESN) of that terminal to generate the random number. The random number is then compared with the sampling percentage to decide whether the terminal needs to perform the logging function.
6. Log Size This is the maximum amount of memory that the terminal reserves for storing the logged usage tracking data.
7. Logging Status This parameter can take one of the three values.

Logging ON: This value indicates to the terminal that the current usage tracking request is valid and that the terminal should continue logging.

Stop logging and Send Log: This value indicates that the terminal should discontinue logging for the remaining period of the usage tracking notification. The terminal then uploads the logged data at the next packet data session.

Stop logging and Discard Log: This value indicates that the terminal should stop logging for the remaining period of the usage tracking notification and delete the logged data.

In one or more embodiments, the tracking parameters may be in any suitable format and/or data type. For example, each tracking parameter may comprise a parameter identifier and a parameter value. The tracking parameters may be transmitted to the terminals in a single transmission or in multiple transmissions. Furthermore, any number of tracking parameters may be transmitted to the terminals and the tracking parameters may be updated at any time. For example, a set of tracking parameters may be transmitted to the terminals using the overhead notification mechanism, and thereafter, another set of tracking parameters may be transmitted, which operate to change, modify, add to, or delete from the previously transmitted set. Thus, the usage server operates to determine what tracking parameters to send to the terminals to perform the desired usage tracking operation.

A logging window defines a logging session that indicates the amount of time a terminal performs the logging function. In one embodiment, the system provides multiple logging sessions, however, it is preferable to have non-overlapping logging sessions, which means that there will be only one outstanding logging window active at each device at any instant of time. This avoids duplication of logged data in multiple logging windows. After the expiration of the logging window, whenever the terminal contacts the usage tracking server to request any updates, the terminal uses this same session to send the logged usage tracking data to the server. In one embodiment, the terminal piggybacks the logged data at the next packet data session with the server if the memory required to store the logged usage tracking data crosses a certain threshold percentage of the reserved memory. For example, after the terminal has stored enough data to fill eighty percent of the reserved memory (based on the log size), the terminal piggybacks the logged data at the next packet data session with the server.

Anonymous Logging

In one or more embodiments, the usage tracking system operates to protect the privacy rights of the terminal users. For example, in one embodiment, each terminal sends the logged usage data to the usage tracking server in an identifiable manner. On receiving the logged data, the usage tracking server generates a device log identifier using a hashing algorithm. The hashing algorithm is such that it is computationally infeasible to determine the terminal identity from the device log identifier. The inputs to the hashing algorithm are the actual terminal identifier and a subscriber identifier, since a combination of these identifiers uniquely identifies a terminal. The hashing algorithm ensures that the generated device log identifier is unique. The device log identifier can also be used to access and/or correlate tracking data received from a device as the result of a prior logging session.

In one or more embodiments, a variety of hashing algorithms may be used to generate the device log identifier, such as Rotating, One-Time-Hash, CRC-32, MD5, and SHA-1. However, taking into account the collision probability and the complexity of the hashing scheme, the hashing algorithm preferred for generation of the device log identifier is MD5 because the probability of collision for MD5 is very low.

Figure 2:
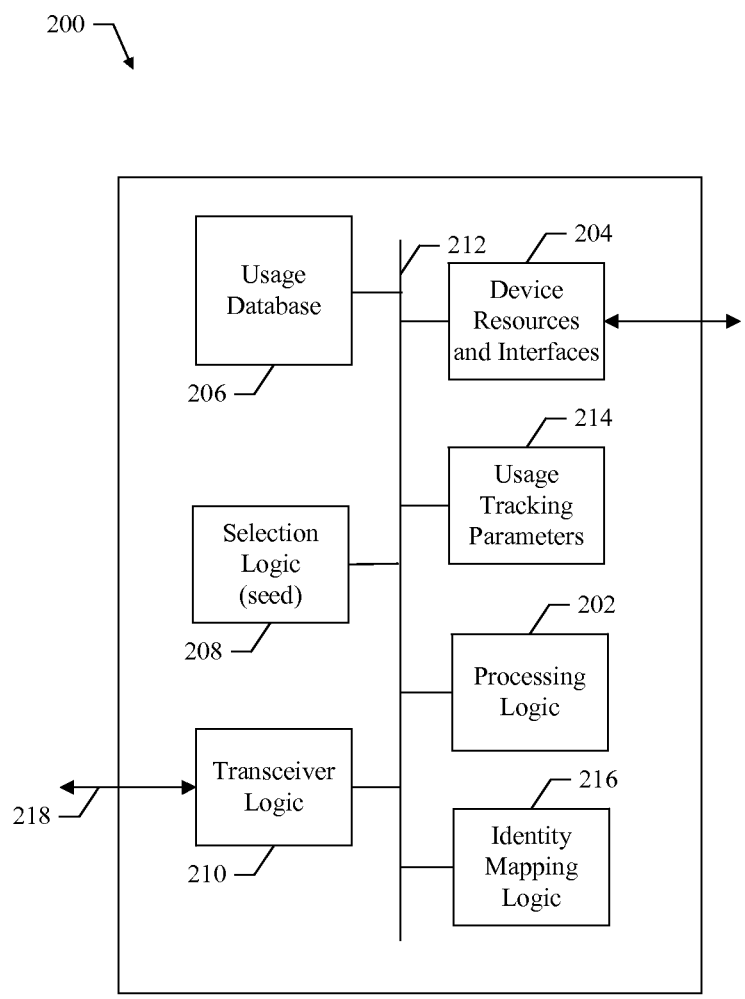
FIG. 2 shows a detailed diagram of one embodiment of a usage tracking server suitable for use in one embodiment of a usage tracking system.

FIG. 2 shows a detailed diagram of one embodiment of a usage tracking server 200 suitable for use in embodiments of a usage tracking system. For example, the server 200 may be used as the server 102 in FIG. 1. The server 200 comprises processing logic 202, device resources 204, usage database 206, selection logic 208, and transceiver logic 210, all coupled to an internal data bus 212. The server 200 also comprises usage tracking parameters 214 and identity mapping logic 216, which are also coupled to the data bus 212.

In one or more embodiments, the processing logic 202 comprises a CPU, processor, gate array, hardware logic, memory elements, virtual machine, software, and/or any combination of hardware and software. Thus, the processing logic 202 generally comprises logic to execute machine-readable instructions to control one or more functional elements of the server 200 via the internal data bus 212.

The device resources and interfaces 204 comprise hardware and/or software that allow the server 200 to communicate with internal and external systems. For example, internal systems may include mass storage systems, memory, display driver, modem, or other internal device resources. The external systems may include user interface devices, printers, disk drives, or other local devices or systems.

The usage database 206 comprises any type of memory device suitable for storing usage data received from one or more terminals in a data network. For example, the usage data may comprise statistics, device parameters, network parameters, or any other type of usage tracking data.

The usage tracking parameters 214 comprise parameters stored in any suitable memory device. The usage tracking parameters 214 represent information that describes how one or more terminals in a data network should operate to log usage tracking data. For example, in one embodiment, the usage tracking parameters 214 may indicate how a terminal device is to track and log the operation of an application program, or track and log the viewing of a presentation by the device user. The usage tracking parameters comprises any suitable format or data type, and any number of parameters may be transmitted by the server to the terminals in one or multiple transmissions.

The transceiver logic 210 comprises hardware and/or software that operates to allow the server 200 to transmit and receive data and/or other information with remote devices or systems via communication channel 218. For example, in one embodiment, the communication channel 218 comprises a control channel to transmit control information to remote devices. For example, in one embodiment, the control channel may be used to transmit the usage tracking parameters to one or more terminals on a data network.

The selection logic 208 comprises hardware and/or software that operates to allow the server 200 to select one or more terminals in a data network for usage tracking. For example, in one embodiment, the selection logic 210 uses a percentage indicator to indicate what percent of the existing pool of terminals should perform usage tracking. For example, the percentage indicator is transmitted to the terminals as part of the tracking parameters. The terminals generate a random number that is compared to the percentage indicator. If the random number is within the range of the percentage indicator, then the terminal will perform usage tracking. In another embodiment, the selection logic 208 utilizes a "seed" value that targets one or more terminals. For example, in one embodiment, the seed value is transmitted as part of the tracking parameters and each terminal uses an exclusive-OR (EXOR) function to combine the seed value with the electronic serial number (ESN) of that terminal to generate the random number. The random number is then compared with the sampling percentage to decide whether the terminal needs to perform the logging function. Such a technique is a repeatable or "deterministic" function because allows the selection logic 208 to select the same set of target terminals for multiple tracking sessions. This allows historical tracking data for any terminal to be collected. However, the selection logic 208 is not limited to using any particular selection scheme so that any suitable type of selection technique may be used by the selection logic 208 to select the targeted set of terminals.

The identity mapping logic 216 comprises a CPU, processor, gate array, hardware logic, memory elements, virtual machine, software, and/or any combination of hardware and software. The identity mapping logic 216 operates to map the identity of terminals that transmit usage data to the server. For example, in one embodiment, the identity mapping logic 216 uses a hashing function to process the original identity of a terminal to produce a device log identity that is associated with the usage tracking data provided by that terminal. The tracking data and device log identity are then stored in the usage database 206 for later processing.

During operation of the server 200, the selection logic 208 determines a targeted set of terminals to perform usage tracking. The targeted set of terminals may comprise one or more terminals from an available pool of terminals. Usage tracking parameters are assembled so that the targeted set of terminals will be activated to perform usage tracking. For example, a selection percentage indicator is included in the tracking parameters to activate the targeted set of terminals. The tracking parameters are transmitted to all terminals in the pool of terminals via an overhead notification mechanism. Each receiving terminal processes the tracking parameters to determine if it is a targeted terminal. For example, in one embodiment, each terminal processes the selection percentage indicator to determine if it is a targeted terminal. If a terminal determines that it is a targeted terminal, it performs usage tracking according to the tracking parameters. After the targeted terminals perform the requested usage tracking they transmit the resulting usage tracking data to the server where the identity of the targeted terminals is mapped to device log identifiers by the mapping logic 216. The usage data and the device log identifiers are then stored in the usage database 206.

In one embodiment, the usage tracking system comprises program instructions stored on a computer-readable media, which when executed by the processing logic 202, provides the functions of the server 200 described herein. For example, instructions may be loaded into the server 200 from a computer-readable media, such as a floppy disk, CDROM, memory card, FLASH memory device, RAM, ROM, or any other type of memory device or computer-readable media that interfaces to the server 200 via the device resources 204. In another embodiment, the instructions may be downloaded into the server 200 from a network resource that interfaces to the server 200 via the transceiver logic 210. The instructions, when executed by the processing logic 202, provide one or more embodiments of a usage tracking system as described herein.

Figure 3:
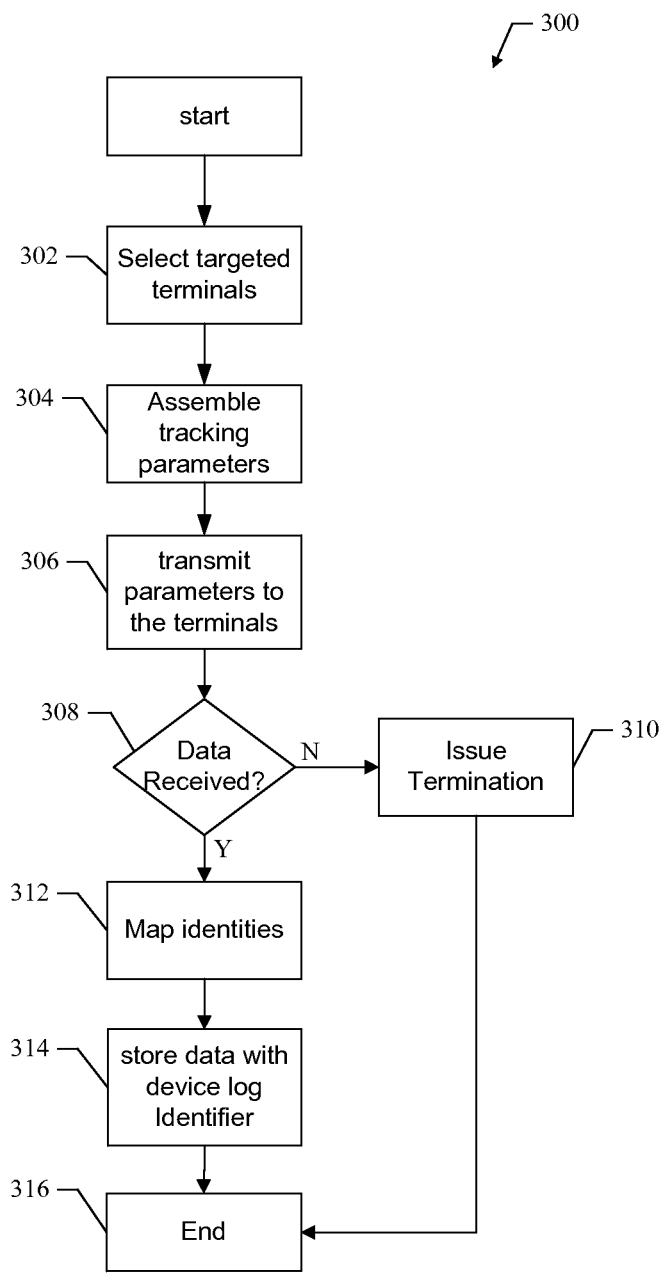
FIG. 3 shows one embodiment of a method for operating a server in one embodiment of a usage tracking system.

FIG. 3 shows one embodiment of a method 300 for operating a server in one embodiment of a usage tracking system. For clarity, the method 300 will be described with reference to the server 200 shown in FIG. 2. In one or more embodiments, the processing logic 202 executes program instructions to perform the functions described below.

At block 302, a set of terminals is targeted for usage tracking. For example, in one embodiment, the processing logic 202 controls the selection logic 208 to select a targeted set of terminals. The selection logic 208 may use a percentage indicator or a seed value to determine a set of terminals that will be requested to perform usage tracking. Virtually any technique may be used to select the targeted set of terminals, including repeatable or deterministic functions that allow the same terminals to be repeatedly selected.

At block 304, usage tracking parameters are assembled that are to be transmitted to the terminals. For example, the processing logic 202 assembles the parameters to be transmitted as the usage tracking parameters 214. The tracking parameters indicate which terminals are to perform usage tracking, and how usage tracking is to be performed by those terminals.

At block 306, the assembled usage tracking parameters are transmitted to the terminals. In one embodiment, the tracking parameters are transmitted only to the targeted terminals. In another embodiment, the tracking parameters are transmitted to all terminal in a pool of terminals. For example, the processing logic 202 controls the transceiver 210 to transmit the parameters via the communication channel 218. In one embodiment, the parameters are transmitted to the terminals via a control channel. In one embodiment, the parameters are transmitted using any type of overhead notification mechanism. Furthermore, the parameters may be transmitted in one or more transmissions and updated as necessary.

At block 308, a test is performed to determine whether usage tracking data has be received at the server. For example, each of the targeted terminals performs usage tracking to obtain logged tracking data according to the usage tracking parameters. Once the tracking data is acquired, the terminals transmit the logged data to the server. If the tracking data is received at the server, the method proceeds to block 312. If the tracking data is not received, the method proceeds to block 310.

At block 310, it is possible for the usage server to terminate any pending tracking operation. In one embodiment, the server disables terminal logging by causing an early expiration of the logging window before its scheduled expiration time. For example, the usage tracking server sets the logging window parameter to zero and transmits this parameter to the terminal, which causes the terminal to terminate any pending usage tracking. However, this termination technique does not provide any information to the terminal about what needs to be done with any data that has already been logged. Thus, the logged data could either be discarded or be uploaded to the usage tracking server in another communication session with the server.

In another embodiment, an additional usage tracking parameter referred to as Logging Status is transmitted to the terminal. The Logging Status field indicates to the terminal whether the terminal should discontinue logging and provides information on whether the logged data should be discarded. For example, if it is required that the terminal discard the logged data, the Logging Status field can be set to "Stop Logging and Discard Log." When the terminal receives the updated parameters, depending upon the "Logging Status" value it either piggybacks the logged data in a transmission to the server or discards it. The method then proceeds to block 316.

At block 312, the identities of the responded terminals are mapped to device log identifiers. For example, in one embodiment, the identity mapping logic uses a hash function to map the identity of a terminal to a device log identity. The hash function takes the true identity of the terminal as input, and generates the device log identity. The device log identity cannot be reversed to discover the true identity of the terminal. Although a hash function has been described, it is possible to use any suitable identity mapping technique to protect the identity of the responding terminals.

At block 314, the usage tracking data from responding terminals is associated with the appropriate device log identifiers. The data and the device log identifiers are then stored in the usage database 206 and the method proceeds to block 316 where any received usage tracking data can now be processed. For example, the server 200 may now create usage reports from the received usage tracking data. The usage reports will reference the device log identifiers so that the privacy of the actual terminals is protected from disclosure.

It should be noted that the method 300 illustrates just one embodiment and that changes, additions, or rearrangements of the flow elements may be made without deviating from the scope of the described embodiments.

Figure 4:
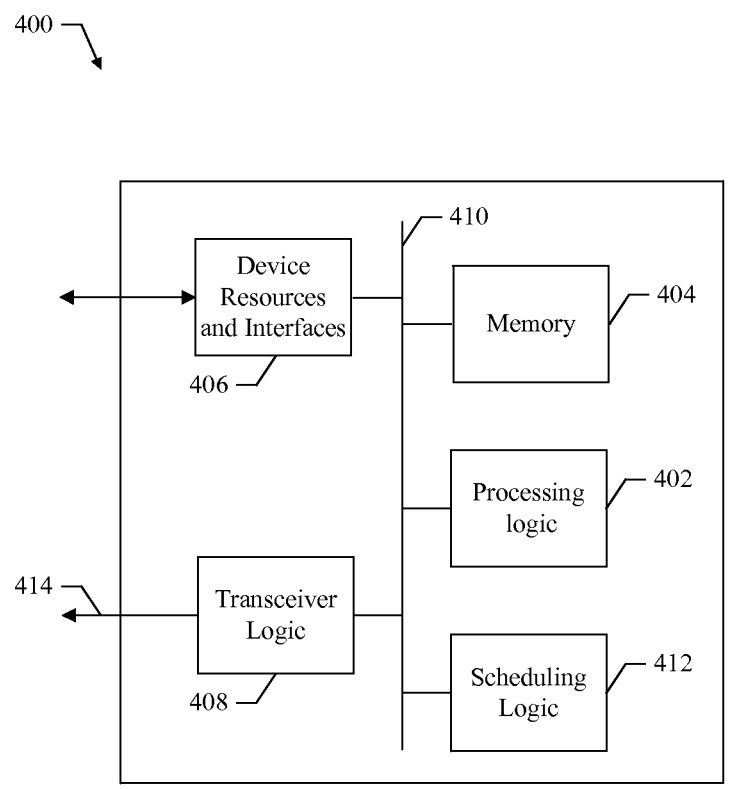
FIG. 4 shows a detailed diagram of one embodiment of a terminal suitable for use in one embodiment of a usage tracking system.

FIG. 4 shows a detailed diagram of one embodiment of a terminal 400 suitable for use in one embodiment of a usage tracking system. The terminal 400 comprises processing logic 402, memory 404, device resources and interfaces 406, transceiver logic 408, all coupled to a data bus 410. The terminal 400 also comprises scheduling logic 412, which is also coupled to the data bus 410.

In one or more embodiments, the processing logic 402 comprises at least one of a CPU, processor, gate array, hardware logic, memory elements, virtual machine, software, and/or any combination of hardware and software. Thus, the processing logic 402 generally comprises logic to execute machine-readable instructions to control one or more other functional elements of the terminal 400 via the internal data bus 410.

The device resources and interfaces 406 comprise hardware and/or software that allow the terminal 400 to communicate with internal and external systems. For example, internal systems may include mass storage systems, memory, display driver, modem, or other internal device resources. The external systems may include user interface devices, printers, disk drives, or other local devices or systems.

The transceiver logic 408 includes receiving logic and transmitting logic that comprises hardware and/or software that operates to allow the terminal 400 to transmit and receive data and/or other information with external devices or systems via communication channel 414. For example, the transceiver logic 408 may comprise control channel logic to receive control information from a remote server. The control channel logic may comprise any suitable hardware and/or software and implement any type of control channel suitable for exchanging information with a remote server.

In an aspect, the transceiver logic 408 comprises receiving logic that operates to receive network communications, such as broadcasts, multicasts, unicasts, SMS messages, and/or any other type of communications that allows the device 400 to receive notifications and tracking parameters. In another aspect, the transceiver logic 408 comprises transmitting logic that operates to transmit tracking logs to a usage server in one or more unicast transmissions.

The memory 404 comprises any type of memory suitable for storing information at the terminal 400. For example, the terminal 400 may operate to log usage data according to usage parameters and store the usage data in the memory 404 for further processing.

The scheduling logic 412 operates to schedule logging of usage data according to usage parameters. For example, the scheduling logic 412 may receive the usage parameters via a transmission from a usage server. The usage parameters describe how, what, and when the terminal 400 will log usage data. If the usage parameters identify a time window within which the data should be logged, the scheduling logic 412 alerts the processing logic 402 to log the data within the defined time window.

During operation, the terminal 400 operates according to one or more embodiments of a usage tracking system to log usage data. In one embodiment, the terminal performs one or more of the following functions to log the usage data. It should be noted that the following functions may be changed, rearranged, modified, add to, or otherwise adjusted within the scope of the embodiments.

1. The terminal receives tracking parameters via an overhead notification mechanism.
2. The terminal determines from the tracking parameters whether it is a targeted terminal.
3. If the terminal is a targeted terminal, it determines from the tracking parameters what information is to be tracked and when the tracking should occur. The terminal may also obtain other information or instructions from the tracking parameters.
4. The terminal then performs usage tracking according to the tracking parameters and stores the logged tracking data into its local memory.
5. When tracking is complete, the terminal transmits the logged tracking data to a usage tracking server.

In one embodiment, the usage tracking system comprises program instructions stored on a computer-readable media, which when executed by the processing logic 402, provides the functions of the terminal 400 described herein. For example, instructions may be loaded into the terminal 400 from a computer-readable media, such as a floppy disk, CDROM, memory card, FLASH memory device, RAM, ROM, or any other type of memory device or computer-readable media that interfaces to the terminal 400 via the device resources 406. In another embodiment, the instructions may be downloaded into the terminal 400 from a network resource that interfaces to the terminal 400 via the transceiver logic 408. The instructions, when executed by the processing logic 402, provide one or more embodiments of a usage tracking system as described herein.

Figure 5:
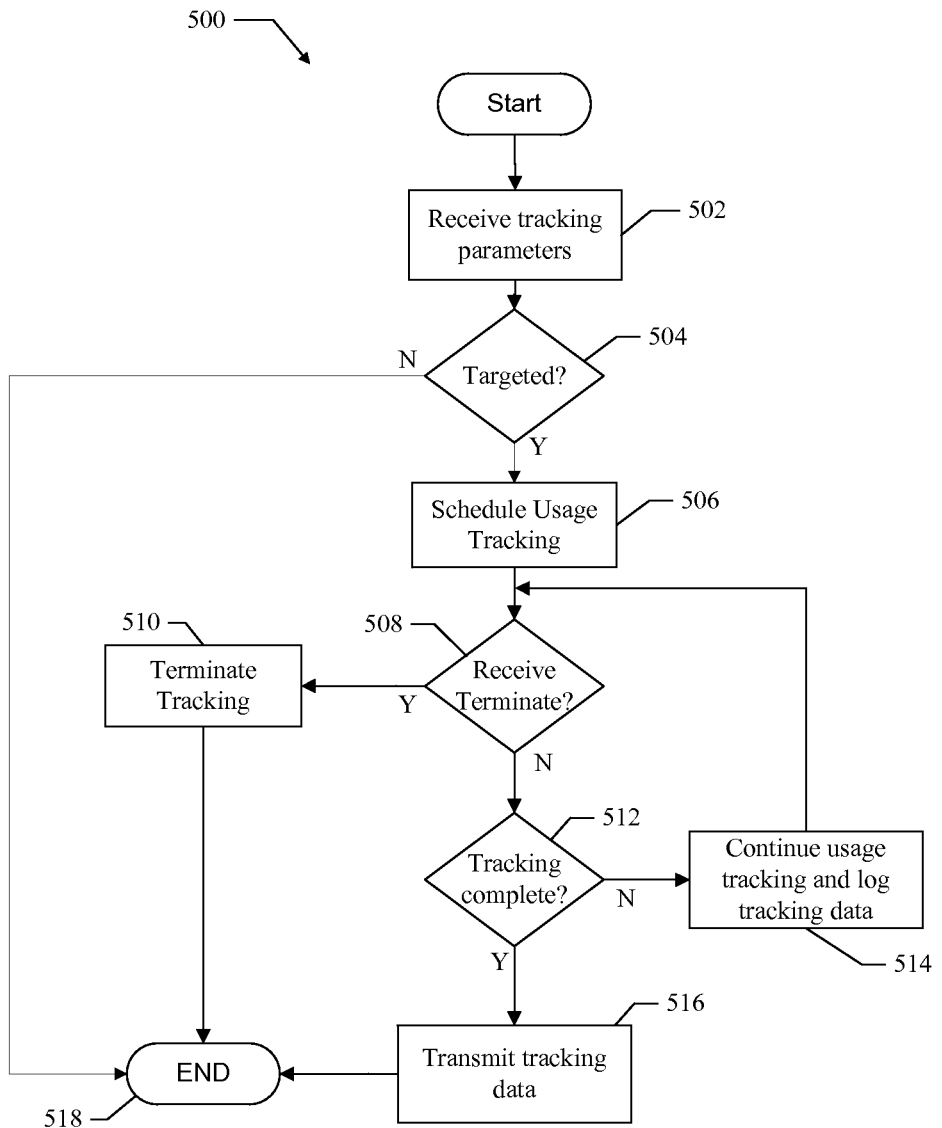
FIG. 5 shows one embodiment of a method for operating a terminal in one embodiment of a usage tracking system.

FIG. 5 shows one embodiment of a method 500 for operating a terminal in one embodiment of a usage tracking system. For clarity, the method 500 will be described with reference to the terminal 400 shown in FIG. 4. In one or more embodiments, the processing logic 402 executes program instructions to perform the functions described below.

At block 502, tracking parameters are received at the terminal from a usage server in a data network. For example, the processing logic 402 receives the tracking parameters via an overhead notification mechanism that may comprise a control channel that is part of the transceiver logic 408. In one embodiment, the tracking parameters describe when and what usage data will be logged at the terminal. The tracking parameters are stored in the memory 404.

At block 504, a test is performed to determine if the terminal has been selected as a targeted terminal. For example, the processing logic 402 processes the tracking parameters to determine if the terminal is a targeted terminal. In one embodiment, the processing logic 402 generates a random number that is compared to a percentage indicator included in the tracking parameters. If the random number is within a selected range defined by the percentage indicator, then the terminal is a targeted terminal. In another embodiment, the tracking parameters include a seed value and the processing logic 402 combines the seed value with a terminal identifier to generate a selection indicator that is then compared to the percentage indicator. If the selection indicator is within a selected range defined by the percentage indicator, then the terminal is a targeted terminal. Thus, any suitable technique may be used by the terminal to determine if it is a targeted terminal.

At block 506, the usage tracking at the terminal is scheduled. For example, the scheduling logic 412 operates to schedule usage tracking according to the tracking parameters stored in the memory 404. For example, the tracking parameters may include a time window indicator that identifies a time period when usage tracking should occur. The scheduling logic 412 processes the time window indicator to schedule usage tracking.

At block 506, a test is performed to determine if the terminal has received any tracking parameters that will terminate any pending usage tracking. For example, the usage server may terminate usage tracking by transmitting updated tracking parameters to the terminal. In one embodiment, the server transmits tracking parameters that set the time window indicator to zero. In response, the terminal terminates any pending usage tracking and either discards any collected data or sends it to the server in their next communication session. If usage tracking is terminated, the method proceeds to block 510. If usage tracking has not been terminated, the method proceeds to block 512.

At block 510, usage tracking is terminated and any logged data will either be transmitted to the usage server at the next available communication or discarded. In one embodiment, the processing logic 402 processes the logging status tracking parameter to determine how to handle previously logged tracking data. The method then ends at block 518.

At block 512, a test is performed to determine if the usage tracking is complete. For example, in one embodiment, usage tracking is scheduled to occur within a selected time window. If usage tracking has occurred during the time window and the time window has expired, then the usage tracking is complete. In one embodiment, the terminal may be realized that the usage tracking data is no longer of interest, and as a result, the terminal stop logging and either discards the logged usage tracking data or attempts to upload the available data. If the usage tracking is complete, the method proceeds to block 516. If the usage tracking is not complete, the method proceeds to block 514.

At block 514, the terminal continues logging usage data in accordance with the tracking parameters. For example, in one embodiment, the processing logic 402 retrieves the tracking parameters from the memory 404 and logs device usage accordingly. The logged tracking data is then stored in the memory 404 until the tracking is terminated or the tracking window expires. The method proceeds to block 508 where a test is performed to determine if a terminal instruction has been received.

At block 516, usage tracking is completed and the terminal transmits the usage tracking data to the usage server. For example, the tracking data is transmitted during communications between the terminal and the usage server. In one embodiment, the tracking data is transmitted in an identifiable manner and the server operates to map the identity of the terminal to a device log identifier that protects the identity of the terminal.

Thus, the method 500 operates to allow a terminal to receive tracking parameters and perform usage tracking accordingly. It should be noted that the method 500 illustrates just one embodiment and that changes, additions, or rearrangements of the flow elements may be made without deviating from the scope of the described embodiments.

Designated Terminal Usage Tracking

Figure 6:
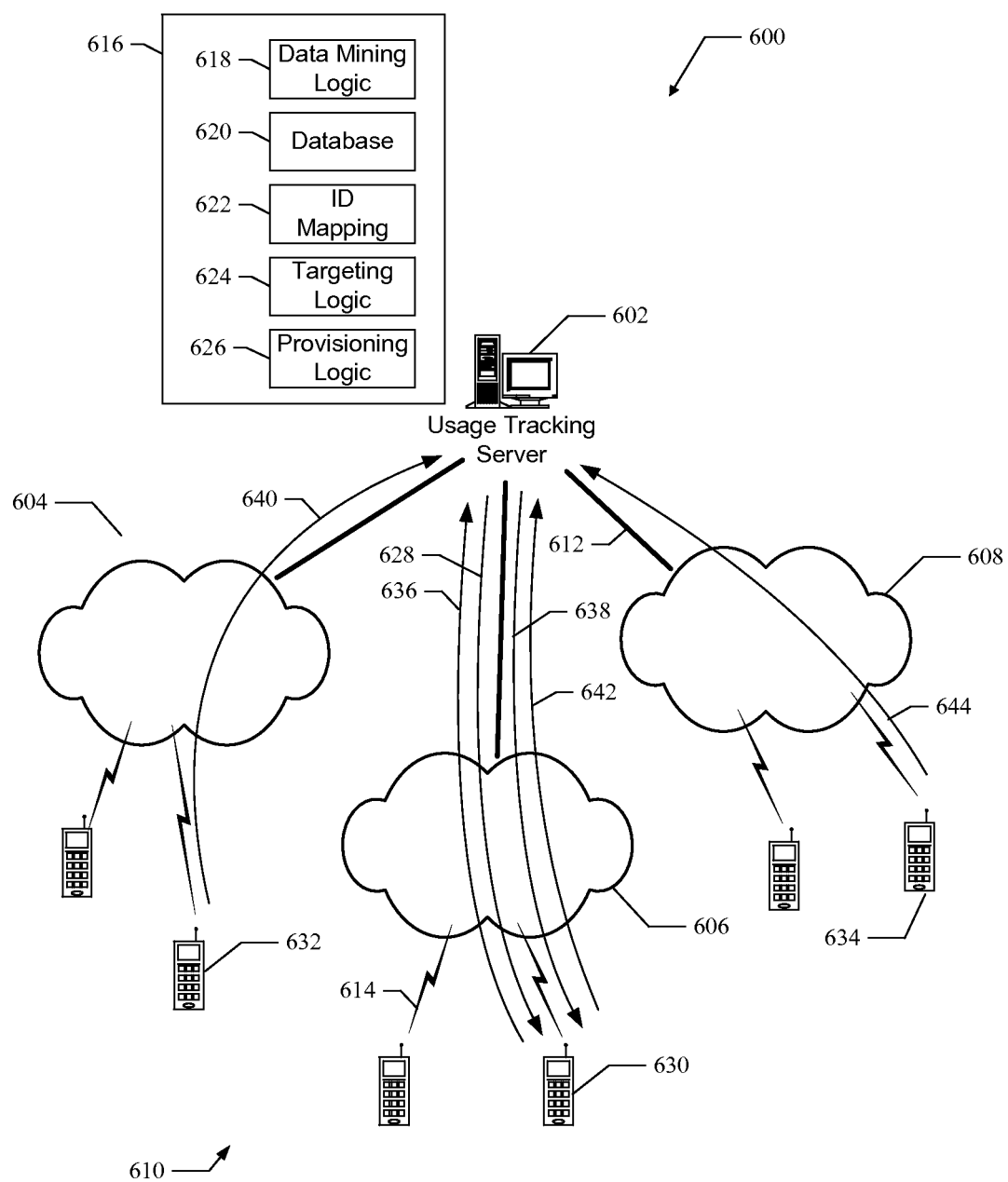
FIG. 6 shows an exemplary network for use in aspects of a usage tracking system.

FIG. 6 shows an exemplary data network 600 that comprises aspects of a usage tracking system. The network 600 comprises a usage tracking server 602, networks 604, 606, and 608, and a pool of terminals shown generally at 610. The networks 604, 606 and 608 may be any type and/or combination of wired and/or wireless networks. For example, the networks 604, 606, and 608 may each be proprietary communication networks that provide services and communication capabilities to the terminals 610. In an aspect, the terminals 610 are configured as terminal 400 shown in FIG. 4. The terminals 610 comprise any devices suitably configured to communicate with the networks 604, 606, and 608. For the purpose of this description, the term "terminal" is used interchangeably with the term "device."

The server 602 communicates with the networks 604, 606, and 608 via communication channels illustrated at 612. The communication channels 612 may be any type of wired or wireless communication channels that allows the server 602 to communicate over the networks 604, 606, and 608. The networks 604, 606, and 608 provide communication with the terminals 610 via wireless communication links illustrated at 614 that allow data to be wirelessly transmitted between the networks 604, 606, and 608 and the terminals 610. In an aspect, the wireless communication links 614 comprise forward communication channels, reverse communication channels, control channels, and/or any other type of communication channel that may be used to communicate information between the networks 604, 606, and 608 and the terminals 610. Thus, the networks 604, 606, and 608 are able to communicate with the terminals 610 using a broadcast, multicast, unicast, messaging channel, control channel, and/or any other communication technique.

The server 602 comprises usage tracking logic 616 that comprises provisioning logic 626, targeting logic 624, identity (ID) mapping logic 622, database 620 and data mining logic 618.

In an aspect, the targeting logic 624 comprises at least one of a CPU, processor, gate array, hardware logic, memory elements, virtual machine, software, and/or any combination of hardware and software. The targeting logic 624 operates to determine one or more designated terminals that are to perform usage tracking. The designated terminals are terminals that are specifically identified based on any type of selection criteria. For example, any of the terminals 610 may be designated for usage tracking based on demographics, location, market, operational parameters, performance, subscriptions, registrations, and/or any other selection criteria.

Once the designated terminals are determined, the targeting logic 624 operates to transmit notifications to the designated terminals to notify them of their selection for usage tracking. In an aspect, the targeting logic 624 operates to send the notifications to the designated terminals using a broadcast, multicast, unicast, SMS message and/or any other type of communication, such as through an out-of-band communication. For example, a notification is transmitted to the terminal 630 as illustrated by path 628. It will be assumed that notifications have been transmitted to the terminals 632 and 634. It should be noted that any portion or all of the terminals 610 may be selected as designated terminals based on any selection criteria.

Once a terminal has received a notification that it has been designated for usage tracking, the terminal has the choice of opting-in or opting-out of the usage tracking session. For example, the terminal 630 transmits a notification response 636 to the server 602 indicating whether or not it wishing to participate in the usage tracking session. It will be assumed that the terminals 630, 632, and 634 have been selected as designated terminals and respond with notification responses indicating that they opt-in to the usage tracking session. In another aspect, a terminal may manually opt-in or opt-out of the usage tracking session. For example, a terminal user may take the device to a service center where service personnel communicate with the server 602 to manually opted-in the device to become a designated terminal in the usage tracking session.

The provisioning logic 626 comprises at least one of a CPU, processor, gate array, hardware logic, memory elements, virtual machine, software, and/or any combination of hardware and software. The provisioning logic 626 operates to assemble usage tracking parameters that are transmitted to the designated terminals. For example, the usage tracking parameters transmitted to the terminal 630, are illustrated by path 638. It should be noted that the usage tracking parameters may be transmitted to the terminals using any communication means, such as by using one or more of a broadcast, multicast, unicast, or any other communication means. The usage tracking parameters operate to identify when tracking occurs, what applications are to be tracked, what events are to be tracked, and an upload window that identifies when the tracking results are to be uploaded to the server 602. A more detailed description of the usage tracking parameters provided by the provisioning logic 626 is provided in another section of this document.

In an aspect, the provisioning logic 626 operates to control when the tracking information (i.e., tracking data or logs) is uploaded from the designated terminals to the server 602. For example, the tracking parameters identify one or more upload windows that identify when each designated terminal is to upload its tracking data. Thus, it is possible to define upload windows that accommodate any type of network criteria, bandwidth limitations, device limitations, transmission schedule, and/or any other criteria or preferences associated with the proprietary networks 604, 606, and 608 or the devices 610. For example, the terminal 632 is directed to upload it tracking data during a first selected upload window, as shown by path 640, the terminal 630 is directed to upload its tracking data, during a second selected upload window as shown by path 642, and the terminal 634 is directed to upload its tracking data, during a third selected upload window, as shown by path 644. Thus, the provisioning logic 626 operates to control when tracking logs are uploaded from the designated terminals to accommodate any type of criteria or preferences of the proprietary networks 604, 606, and 608, and/of the designated terminals.

The identity (ID) mapping logic 622 comprises at least one of a CPU, processor, gate array, hardware logic, memory elements, virtual machine, software, and/or any combination of hardware and software. The identity mapping logic 622 operates to map the identity of responding terminals so that the privacy of the usage tracking data they provide will be protected. For example, the ID mapping logic 622 associates the usage tracking data with device log identifiers that do not directly identify the source of the usage tracking data. The usage tracking data and device log identifiers are then stored in a usage tracking database 620. By storing the usage tracking data in the database 620, it is possible for the server 602 to construct a usage tracking history for any of the terminals 610. In another aspect, each of the designated terminals comprises identity mapping logic (not shown) that operates to conceal its identity. The identity mapping logic generates a terminal identifier that is included with the tracking data so that the server 602 can associated tracking data with a particular terminal. Thus, any suitable type of identity mapping technique may be used in aspects of the usage tracking system.

The data mining logic 618 comprises at least one of a CPU, processor, gate array, hardware logic, memory elements, virtual machine, software, and/or any combination of hardware and software. The data mining logic 618 operates to process the usage tracking information stored in the database 620 to determine any selected aspect or characteristic of the tracking information. In an aspect, the data mining logic 618 operates to determine characteristics of the usage tracking data from each designated terminal to decide how any selected aspect of usage tracking can be adjusted. For example, the data mining logic 618 processes the database 620 to determine how to select designated terminals or to adjust the tracking parameters for additional tracking sessions.

In an aspect, the usage tracking system is embodied in a computer program product that comprises one or more program instructions ("instructions") or sets of "codes" stored on a machine-readable medium, which when executed by at least one processor, provide the functions described herein. For example, the sets of codes may be loaded into the usage tracking logic 616 from a machine-readable medium, such as a floppy disk, CDROM, memory card, FLASH memory device, RAM, ROM, or any other type of memory device or machine-readable medium. In another aspect, the sets of codes may be downloaded into the usage tracking logic 616 from an external device or network resource. The sets of codes, when executed, provide aspects of a usage tracking system as described herein.

Thus, in various aspects, a usage tracking system operates to track the usage of one or more designated terminals in a data network. The resulting usage database is mined for information to adjust the operation of the usage tracking system.

In an aspect, the usage tracking system operates to provide usage tracking by performing one or more of the following functions.

1. One or more designated terminals are determined.
2. Notifications are sent to each designated terminal.
3. The designated terminals receive the notifications and each terminal decides whether to opt-in or opt-out of the designated group. Terminals may also manually opt-in to a designated group using a service center.
4. The "opted-in" designated terminals receive tracking parameters associated with a tracking session that indicate what applications are to be tracked, what events associated with each application are to be tracked, when tracking is to occur, and one or more upload windows that indicated when tracking logs are to be uploaded.
5. The opted-in designated terminals perform usage tracking for one or more applications.
6. The opted-in designated terminals transmit usage tracking logs during pre-determined upload windows.

Figure 7:
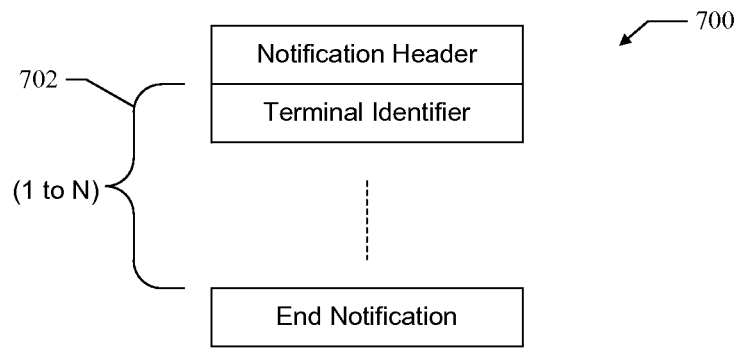
FIG. 7 shows an exemplary notification message for use in aspects of a usage tracking system.

FIG. 7 shows an exemplary notification message 700 for use in aspects of a usage tracking system. For example, in an aspect, the notification message 700 is generated by the targeting logic 624. The notification message 700 comprises one or more terminal identifiers 702 that identify terminals that have been selected as designated terminals by the targeting logic 624. In an aspect, the notification message 700 is transmitted over the network 600 in a broadcast, multicast, unicast, SMS message, and/or any other type of message transmission to notify one or more terminals that they have been designated for usage tracking.

Figure 8:
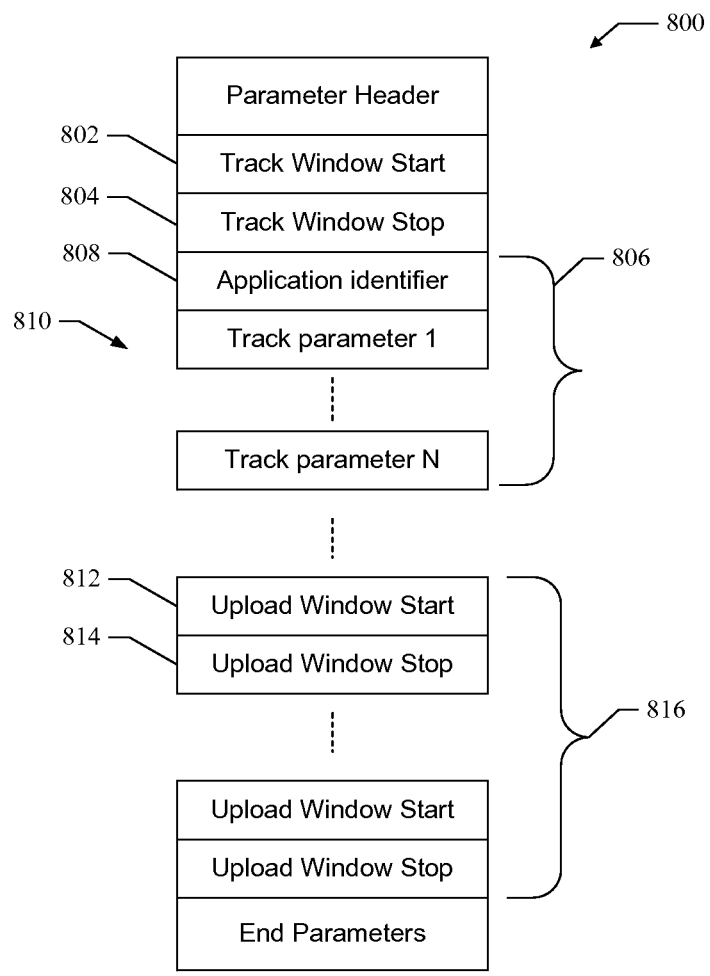
FIG. 8 shows exemplary tracking parameters for use in aspects of a usage tracking system.

FIG. 8 shows exemplary tracking parameters 800 for use in aspects of a usage tracking system. For example, in an aspect, the tracking parameters 800 are generated by the provisioning logic 626. The tracking parameters 800 comprise a tracking window start indicator 802 and a tracking window stop indicator 804 that identify when usage tracking at designated terminals is to begin and end.

The tracking parameters 800 also comprise one or more instances 806 of an application identifier 808 and one or more tracking parameters 810. For example, the application identifier 808 identifies a particular application and the one or more tracking parameters 810 identify application events that are to be tracked. In an aspect, the following application events can be tracking during operation of the usage tracking system.

1. User Behavior Events, such as a user interface launch event, subscription event, URL activity event, or purchase event.
2. Delivery Events, such as a license delivery event or presentation delivery event.
3. Failure Events, such as real-time service play event, subscription failure event, or presentation delivery failure event.
4. Mobility Events, such as time zone change, or other mobility events.

5. System Events, such as usage tracking session abort event.

6. Cellular Service Event, such as SMS send/receive event, voice call event, or packet data event.

7. Other Events.

The tracking parameters 800 also comprise an upload window start time 812 and an upload window stop time 814. The upload start 812 and stop 814 times define an upload window during which a designated terminal is to upload its tracking data. In an aspect, multiple upload window start and stop times defining multiple upload windows are provided as illustrated at 816.

Figure 9:
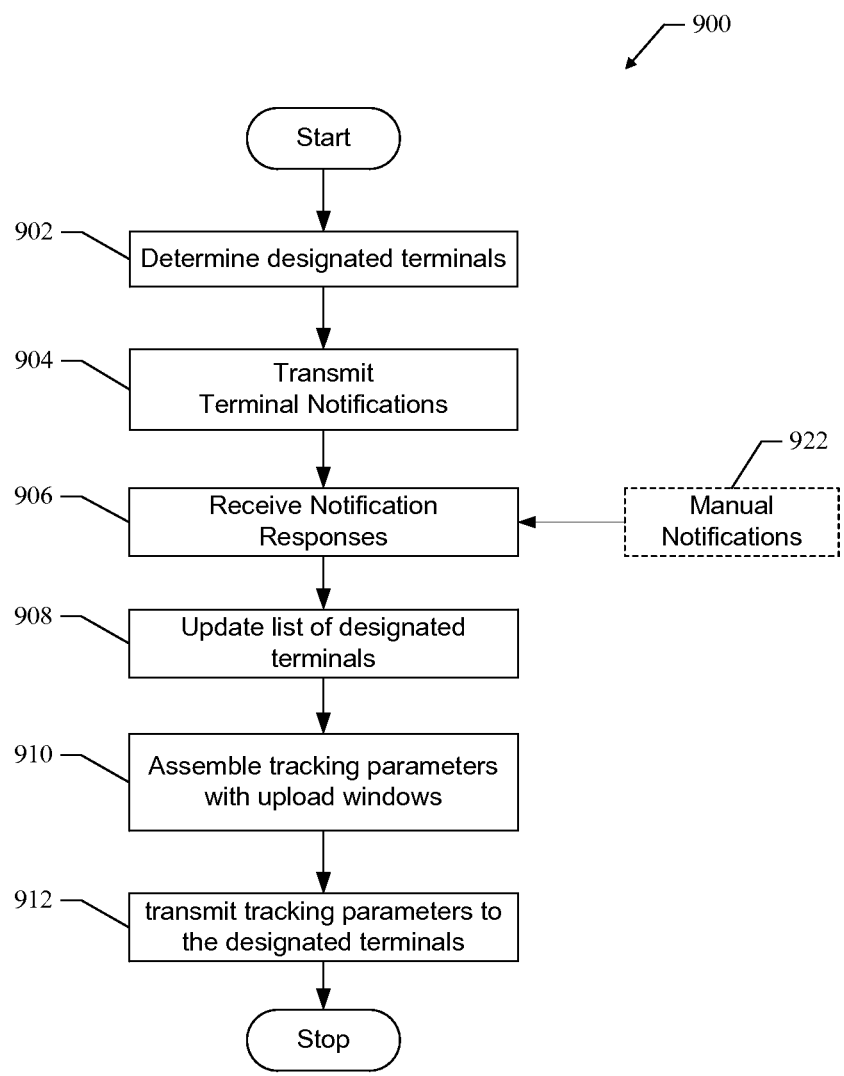
FIG. 9 shows an exemplary method for operating a server for use in aspects of a usage tracking system.

FIG. 9 shows an exemplary method 900 for operating a server for use in aspects of a usage tracking system. For clarity, the method 900 is described herein with reference to the usage tracking server 602 shown in FIG. 6. For example, in an aspect, the usage tracking server 602 executes one or more sets of codes to perform the functions described below.

At block 902, designated terminals are determined. For example, the targeting logic 624 operates to determine one or more designated terminals based on demographics, geographic area, operational parameters, network conditions, and/or any other selection criteria.

At block 904, notifications are transmitted to the designated terminals. For example, in an aspect, the targeting logic 624 operates to transmit the notifications to the designated terminals using a broadcast, multicast, unicast, SMS message, and/or any other type of communication technique. In an aspect, the notifications are formatted as shown in FIG. 7.

At block 906, notification responses are received. For example, terminals that have received notifications operate to transmit a notification response that indicates whether they opt-in or opt-out of the designated group. In another aspect, shown at block 922, manual notifications are received. For example, a device user may manually opt-in to the designated group. In an aspect, the targeting logic 624 operates to receive the notification responses and manual notification responses.

At block 908, a list of designated terminals is updated. In an aspect, the targeting logic 624 operates to update the list of designated terminals based on the notification responses and manual notification responses received at block 906.

At block 910, tracking parameters are assembled. In an aspect, the tracking parameters identify when usage tracking is to occur, one or more applications and associated events that are to be tracked, and one or more upload windows. For example, one or more upload window parameters are provided to identify when a designated terminal is to upload its tracking logs. In an aspect, the tracking parameters are formatted as shown in FIG. 8.

At block 912, the tracking parameters are transmitted to the designated terminals. For example, in an aspect, the targeting logic 624 operates to transmit the tracking parameters to the designated terminals using a broadcast, multicast, unicast, SMS message, and/or any other type of communication technique.

Thus, the method 900 operates to provide an aspect of usage tracking system. It should be noted that the method 900 represents just one implementation and that other implementations are possible within the scope of the aspects.

Figure 10:
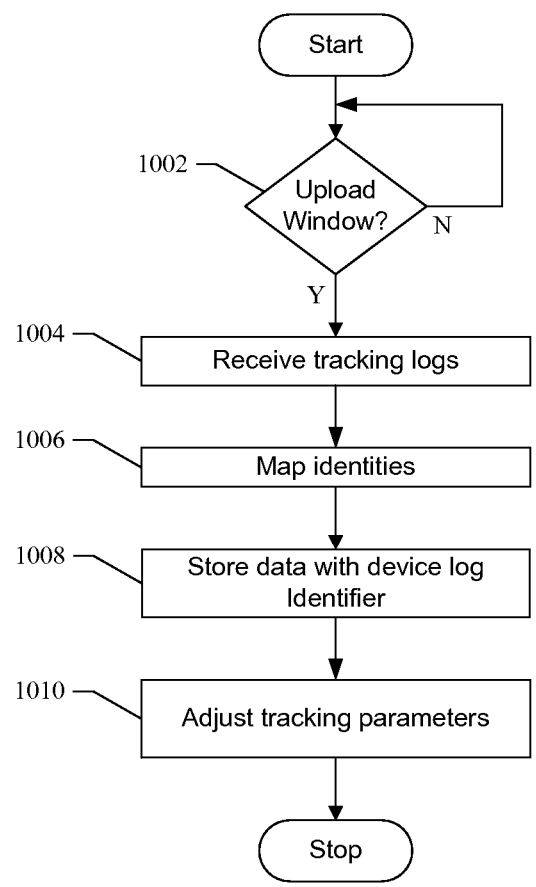
FIG. 10 shows an exemplary method for operating a server for use in aspects of a usage tracking system.

FIG. 10 shows an exemplary method 1000 for operating a server for use in aspects of a usage tracking system. For clarity, the method 1000 is described herein with reference to the usage tracking server 602 shown in FIG. 6. For example, in an aspect, the usage tracking server 602 executes one or more sets of codes to perform the functions described below. It should be noted that the methods 900 and 1000 may be performed by the server 602 either serially or in parallel to provide various aspects of a usage tracking system.

At block 1002, a determination is made as to whether an upload window has begun. For example, the provisioning logic 626 determines when an upload window associated with one or more designated terminals has started. If an upload window has not started, the method returns to block 1002. If an upload window has started, the method proceeds to block 1004.

At block 1004, one or more tracking logs are received. In an aspect, one or more of the designated terminals perform usage tracking and upload their tracking logs during the upload window. In an aspect, the tracking logs are received by the ID mapping logic 622.

At block 1006, the identities of responding terminals are mapped. For example, the ID mapping logic 622 operates to map the identities of the responding terminals so as to provide anonymity to the tracking logs to protect terminal identities.

At block 1008, the tracking data is stored in a database. For example, the ID mapping logic 622 operates to store the anonymous terminal identifiers and the tracking data in the database 620.

At block 1010, tracking parameters are adjusted. For example, the data mining logic 618 operates to process the stored tracking data to determine how to adjust one or more tracking parameters. For example, based on the usage tracking results, the data mining logic 618 operates to add or subtract one or more terminals to the designated terminal group, add or subtract one or more applications and/or associated application events to/from the tracking parameters, and/or make any other type of adjustment to the tracking parameters for any additional tracking sessions.

Thus, the method 1000 operates to provide an aspect of usage tracking system. It should be noted that the method 1000 represents just one implementation and that other implementations are possible within the scope of the aspects.

Figure 11:
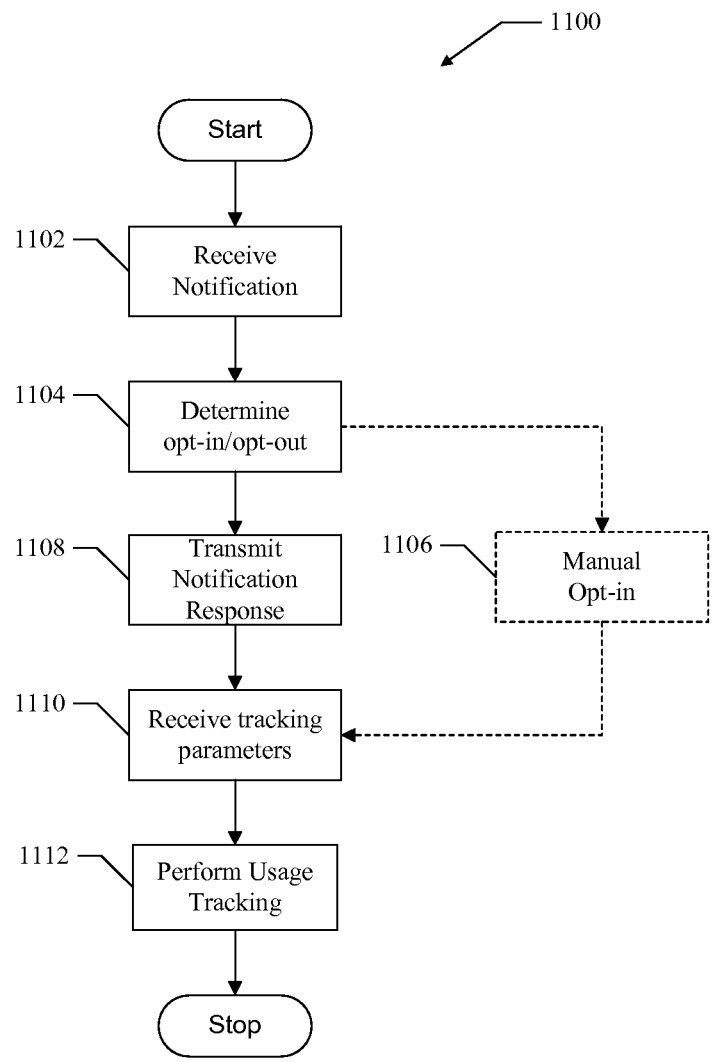
FIG. 11 shows an exemplary method for operating a device for use in aspects of a usage tracking system.

FIG. 11 shows an exemplary method 1100 for operating a device for use in aspects of a usage tracking system. For clarity, the method 1100 is described herein with reference to the terminal 400 shown in FIG. 4. For example, in an aspect, the processing logic 402 executes one or more sets of codes to control the terminal 400 to perform the functions described below.

At block 1102, a notification is received. In an aspect, the notification is received by the transceiver logic 408. For example, the notification is received in a broadcast, multicast, unicast, SMS message, or any other type of communication and is formatted as shown in FIG. 7.

At block 1104, a determination is made whether to opt-in or opt-out from the usage tracking session associated with the notification. For example, the processing logic 402 operates to determine whether to opt-in or opt-out from the usage tracking session. It will be assumed for this description that the processing logic 402 decides to opt-in to the usage tracking session. For example, the processing logic 402 operates to obtain user preference from the memory 404 that indicate whether or not the terminal 400 should opt-in or opt-out of usage tracking sessions.

At block 1106, in an optional operation, the terminal manually opts-in. For example, the terminal 400 is taken to a service center and service personnel control the terminal 400 to manually opt-in to the usage tracking session by sending a manual notification response to a usage tracking server.

At block 1108, a notification response is transmitted. In an aspect, the processing logic 402 operates to transmit a notification response to a usage tracking server that indicates whether the terminal 400 opt-in or opt-out of the usage tracking session. In an aspect, the notification response is sent in a unicast transmission, but may be sent in any suitable type of transmission.

At block 1110, tracking parameters are received. In an aspect, the transceiver logic 408 operates to receive the tracking parameters. The tracking parameters are then passed to the processing logic 402. In an aspect, the tracking parameters comprise parameters as illustrated in FIG. 8 and comprise logging window start and stop parameters, application identifiers with associated tracking parameters, and upload window parameters.

At block 1112, usage tracking is performed. In an aspect, usage tracking is performed for one or more events associated with one or more applications at the terminal 400. For example, the scheduling logic 412 operates to schedule application event tracking based on the received tracking parameters. During usage tracking one or more tracking logs are created.

Thus, the method 1100 operates to provide an aspect of a usage tracking system. It should be noted that the method 1100 represents just one implementation and that other implementations are possible within the scope of the aspects.

Figure 12:
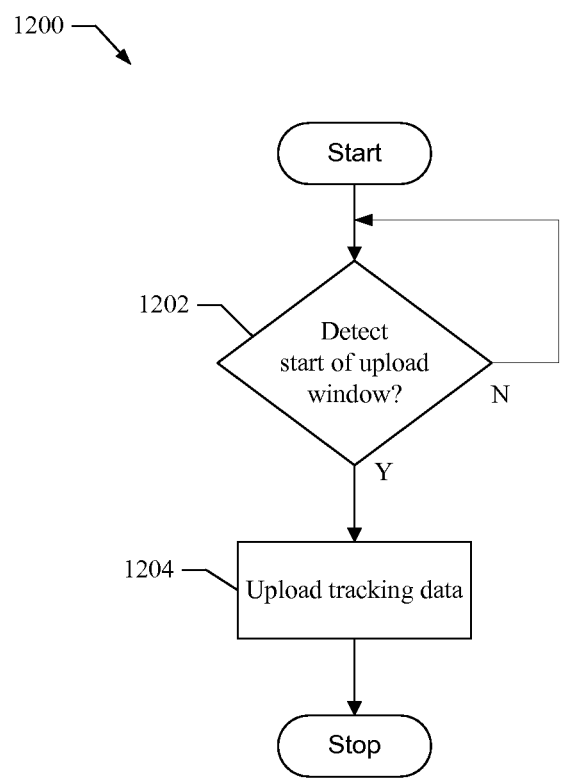
FIG. 12 shows an exemplary method for operating a device for use in aspects of a usage tracking system.

FIG. 12 shows an exemplary method 1200 for operating a device for use in aspects of a usage tracking system. For clarity, the method 1200 is described herein with reference to the terminal 400 shown in FIG. 4. For example, in an aspect, the processing logic 402 executes one or more sets of codes to control the terminal 400 to perform the functions described below. It should be noted that the methods 1100 and 1200 may be performed by the terminal 400 either serially or in parallel to provide various aspects of a usage tracking system.

At block 1202, a determination is made as to whether an upload window has started. In an aspect, the processing logic 402 operates to determine if an upload window has started based on the tracking parameters. For example, in an aspect, the tracking parameters identify a time interval defining an upload window. If an upload window has begun, the method proceeds to block 1204. In the upload window has not begun, the method returns to block 1202.

At block 1204, tracking data is uploaded. In an aspect, the processing logic 402 operates to transmit tracking logs created during a logging session to a usage tracking server at some predetermined or random time that occurs during the upload window. In an aspect, the tracking logs are transmitted to the usage server in a unicast transmission or in any other suitable type of transmission.

Thus, the method 1200 operates to provide an aspect of a usage tracking system. It should be noted that the method 1200 represents just one implementation and that other implementations are possible within the scope of the aspects.

Figure 13:
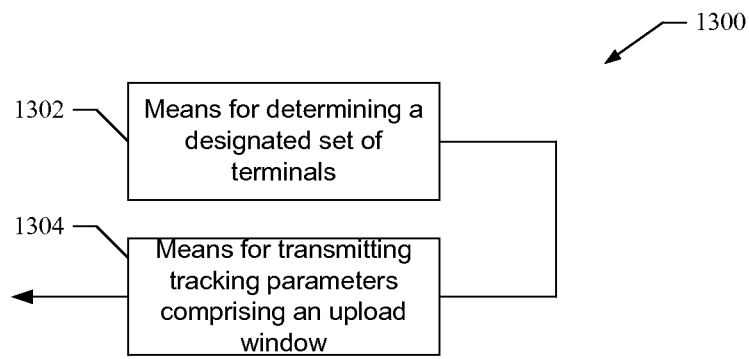
FIG. 13 shows an exemplary server for providing aspects of a usage tracking system.

FIG. 13 shows an exemplary server 1300 for providing aspects of a usage tracking system. In an aspect, the server 1300 is implemented by at least one processor or integrated circuit comprising one or more modules configured to provide aspects of a usage tracking system as described herein. For example, each module comprises hardware, software, or any combination thereof.

The server 1300 comprises a first module comprising means 1302 for determining a designated set of terminals. For example, the means 1302 comprises the targeting logic 624 that operates to determine a designated set of terminals based on any suitable selection criteria.

The server 1300 also comprises a second module comprising means 1304 for transmitting tracking parameters to the designated set of terminals, wherein the tracking parameters identify at least one upload window. For example, in an aspect, the means 1304 comprises the targeting logic 624 that operates to transmit the tracking parameters using at least one of a broadcast, multicast, unicast, SMS message, and/or any other suitable transmission.

Figure 14:
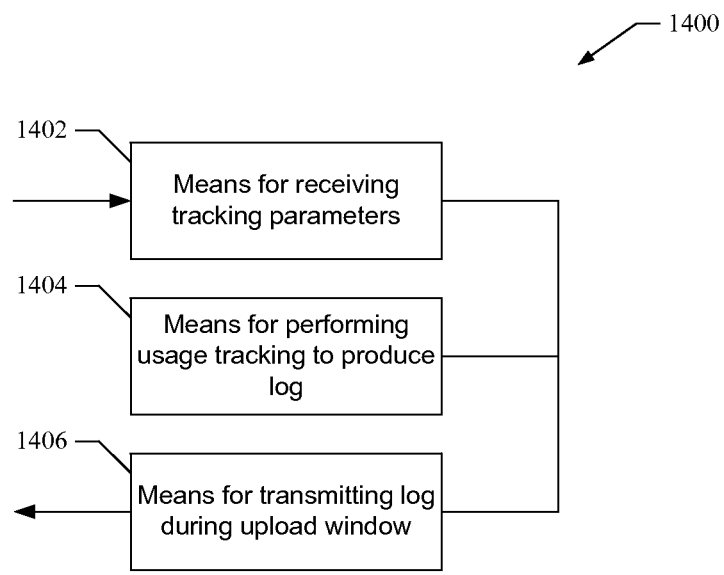
FIG. 14 shows an exemplary terminal for providing aspects of a usage tracking system.

FIG. 14 shows an exemplary device 1400 for providing aspects of a usage tracking system. In an aspect, the device 1400 is implemented by at least one processor or integrated circuit comprising one or more modules configured to provide aspects of an usage system as described herein. For example, each module comprises hardware, software, or any combination thereof.

The device 1400 comprises a first module that comprises means 1402 for receiving tracking parameters that identify at least one upload window. For example, in an aspect, the means 1402 comprises the transceiver logic 408.

The device 1400 comprises a second module that comprises means 1404 for performing usage tracking according to the tracking parameters to produce a tracking log. For example, in an aspect, the means 1404 comprises the scheduling logic 412 and/or the processing logic 402.

The device 1400 also comprises a third module that comprises means 1406 for transmitting the tracking log during the at least one upload window. For example, in an aspect, the means 1406 comprises the transceiver logic 408.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium is coupled to the processor, such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The description of the disclosed aspects is provided to enable any person skilled in the art to make or use the present invention. Various modifications to these aspects may be readily apparent to those skilled in the art, and the generic principles defined herein may be applied to other aspects, e.g., in an instant messaging service or any general wireless data communication applications, without departing from the spirit or scope of the invention. Thus, the present invention is not intended to be limited to the aspects shown herein but is to be accorded the widest scope consistent with the principles and novel features disclosed herein. The word "exemplary" is used exclusively herein to mean "serving as an example, instance, or illustration." Any aspect described herein as "exemplary" is not necessarily to be construed as preferred or advantageous over other aspects.

Accordingly, while aspects of a usage tracking system have been illustrated and described herein, it will be appreciated that various changes can be made to the embodiments without departing from their spirit or essential characteristics. Therefore, the disclosures and descriptions herein are intended to be illustrative, but not limiting, of the scope of the invention, which is set forth in the following claims.

What is claimed is:

1. A method for performing usage tracking, the method comprising:
   determining a set of targeted wireless terminals selected from a plurality of wireless terminals;
   transmitting a notification to each targeted wireless terminal, each notification identifying one targeted wireless terminal as being a target for tracking and one or more applications to be tracked;
   receiving at least one response to the transmitted notifications, the response identifying a wireless terminal and indicating either an approval or a disapproval for tracking;
   transmitting tracking parameters to each one of the identified targeted wireless terminals whose responses to the notifications indicate approval, the tracking parameters identifying at least one upload window, each upload window indicting a unique time range for uploading tracking data to a server; and
   receiving the tracking data from the identified targeted wireless terminals whose responses to the notifications indicate approval within the time ranges indicated by the upload windows, the received tracking data including a plurality of tracking logs, each tracking log containing tracking information collected from the one or more applications.

2. The method of claim 1, wherein said transmitting the tracking parameters comprises transmitting the tracking parameters using at least one of a broadcast, a multicast, and a unicast transmission.

3. The method of claim 1, wherein said transmitting the notification comprises transmitting the notification using at least one of a broadcast, a multicast, and a unicast transmission.

4. The method of claim 1, further comprising receiving at least one notification response that indicates whether a selected terminal opts-in or opts-out of the designated set of terminals.

5. The method of claim 4, wherein said receiving comprising receiving at least one manual notification.

6. The method of claim 1, further comprising:
   mapping an identity of the at least one terminal to at least one device log identifier, respectively; and
   storing the tracking log and the at least one device log identifier in a database.

7. The method of claim 6, further comprising adjusting the tracking parameters based on the database.

8. An apparatus for performing usage tracking, the apparatus comprising:
   a memory; and
   a processor coupled to the memory wherein the processor is configured with software instructions to perform operations comprising:
      determining a set of targeted wireless terminals selected from a plurality of wireless terminals;
      transmitting a notification to each targeted wireless terminal, each notification identifying one targeted wireless terminal as being a target for tracking and one or more applications to be tracked;
      receiving at least one response to the transmitted notifications, the response identifying a wireless terminal and indicating either an approval or a disapproval for tracking;
      determining one or more tracking parameters that identify at least one upload window, each upload window indicting a unique time range for uploading tracking data to a server;
      transmitting the tracking parameters to each one of the identified targeted wireless terminals whose responses to the notifications indicate approval; and
      receiving the tracking data from the identified targeted wireless terminals whose responses to the notifications indicate approval within the time ranges indicated by the upload windows, the received tracking data including a plurality of tracking logs, each tracking log containing tracking information collected from the one or more applications.

9. The apparatus of claim 8, wherein the processor is further configured with software instructions to transmit the tracking parameters using at least one of a broadcast, a multicast, and a unicast transmission.

10. The apparatus of claim 8, wherein the processor is further configured with software instructions to transmit the notification using at least one of a broadcast, a multicast, and a unicast transmission.

11. The apparatus of claim 8, wherein the processor is further configured with software instructions to receive at least one notification response that indicates whether a selected terminal opts-in or opts-out of the designated set of terminals.

12. The apparatus of claim 11, wherein the processor is further configured with software instructions to receive at least one notification response that is a manual notification.

13. The apparatus of claim 8, wherein the processor is further configured with software instructions to perform operations comprising:
   mapping an identity of the at least one terminal to at least one device log identifier, respectively; and
   storing the tracking log and the at least one device log identifier in a database.

14. The apparatus of claim 13, wherein the processor is further configured with software instructions to adjust the tracking parameters based on the database.

15. An apparatus for performing usage tracking, the apparatus comprising:
   means for determining a set of targeted wireless terminals selected from a plurality of wireless terminals;
   means for transmitting a notification to each targeted wireless terminal, each notification identifying one targeted wireless terminal as being a target for tracking and one or more applications to be tracked;
   means for receiving at least one response to the transmitted notifications, the response identifying a wireless terminal and indicating either an approval or a disapproval for tracking;
   means for transmitting tracking parameters to each one of the identified targeted wireless terminals whose responses to the notifications indicate approval, the tracking parameters identifying at least one upload window, each upload window indicting a unique time range for uploading tracking data to a server; and
   means for receiving the tracking data from the identified targeted wireless terminals whose responses to the notifications indicate approval within the time ranges indicated by the upload windows, the received tracking data including a plurality of tracking logs, each tracking log containing tracking information collected from the one or more applications.

16. The apparatus of claim 15, wherein said means for transmitting the tracking parameters comprises means for transmitting the tracking parameters using at least one of a broadcast, a multicast, and a unicast transmission.

17. The apparatus of claim 15, wherein said means for transmitting the notification comprises means for transmitting the notification using at least one of a broadcast, a multicast, and a unicast transmission.

18. The apparatus of claim 15, further comprising means for receiving at least one notification response that indicates whether a selected terminal opts-in or opts-out of the designated set of terminals.

19. The apparatus of claim 18, wherein said means for receiving comprising receiving at least one manual notification response.

20. The apparatus of claim 15, further comprising:
means for mapping an identity of the at least one terminal to at least one device log identifier, respectively; and
means for storing the tracking log and the at least one device log identifier in a database.

21. The apparatus of claim 20, further comprising means for adjusting the tracking parameters based on the database.

22. A computer program product for providing usage tracking, comprising:
a machine-readable non-transitory storage medium comprising:
a first set of codes for causing a computer to determine a set of targeted wireless terminals selected from a plurality of wireless terminals;
a second set of codes for causing the computer to transmit a notification to each targeted wireless terminal, each notification identifying one targeted wireless terminal as being a target for tracking and one or more applications to be tracked;
a third set of codes for causing the computer to receive at least one response to the transmitted notifications, the response identifying a wireless terminal and indicating either an approval or a disapproval for tracking;
a fourth set of codes for causing the computer to transmit tracking parameters to each one of the identified targeted wireless terminals whose responses to the notifications indicate approval, the tracking parameters identifying at least one upload window, each upload window indicting a unique time range for uploading tracking data to a server; and
a fifth set of codes for causing the computer to receive the tracking data from the identified targeted wireless terminals whose responses to the notifications indicate approval within the time ranges indicated by the upload windows, the received tracking data including a plurality of tracking logs, each tracking log containing tracking information collected from the one or more applications.

23. The machine-readable non-transitory storage medium of claim 22, wherein said fourth set of codes is configured to cause the computer to transmit the tracking parameters using at least one of a broadcast, a multicast, and a unicast transmission.

24. The machine-readable non-transitory storage medium of claim 15, wherein said fourth set of codes is configured to cause the computer to transmit the notification using at least one of a broadcast, a multicast, and a unicast transmission.

25. The machine-readable non-transitory storage medium of claim 22, wherein said fourth set of codes is configured to cause the computer to receive at least one notification response that indicates whether a selected terminal opts-in or opts-out of the designated set of terminals.

26. The machine-readable non-transitory storage medium of claim 25, wherein said fourth set of codes is configured to cause the computer to receive at least one manual notification response.

27. The machine-readable non-transitory storage medium of claim 22, wherein said fifth set of codes is configured to cause the computer to:
map an identity of the at least one terminal to at least one device log identifier, respectively; and
store the tracking log and the at least one device log identifier in a database.

28. The machine-readable non-transitory storage medium of claim 27, wherein said fourth set of codes is further configured to cause the computer to adjust the tracking parameters based on the database.

29. At least one integrated circuit configured to provide a method for usage tracking, the at least one integrated circuit comprising:
a first module configured for determining a set of targeted wireless terminals selected from a plurality of wireless terminals;
a second module configured for transmitting a notification to each targeted wireless terminal, each notification identifying one targeted wireless terminal as being a target for tracking;
a third module configured for receiving at least one response to the transmitted notifications, the response identifying a wireless terminal and indicating either an approval or a disapproval for tracking and one or more applications to be tracked;
a fourth module configured for transmitting tracking parameters to each one of the identified targeted wireless terminals whose responses to the notifications indicate approval, the tracking parameters identifying at least one upload window, each upload window indicting a unique time range for uploading tracking data to a server; and
a fifth module configured for receiving the tracking data from the identified targeted wireless terminals whose responses to the notifications indicate approval within the time ranges indicated by the upload windows, the received tracking data including a plurality of tracking logs, each tracking log containing tracking information collected from the one or more applications.

30. The at least one integrated circuit of claim 29, wherein said fourth module is configured for transmitting the tracking parameters using at least one of a broadcast, a multicast, and a unicast transmission.

31. The at least one integrated circuit of claim 29, wherein said fourth module is configured for transmitting the notification using at least one of a broadcast, a multicast, and a unicast transmission.

32. The at least one integrated circuit of claim 29, wherein said fourth module is configured for receiving at least one notification response that indicates whether a selected terminal opts-in or opts-out of the designated set of terminals.

33. The at least one integrated circuit of claim 32, wherein said fourth module is configured for receiving at least one manual notification.

34. The at least one integrated circuit of claim 29, wherein said fifth module is further configured for:

mapping an identity of the at least one terminal to at least one device log identifier, respectively; and storing the tracking log and the at least one device log identifier in a database.

35. The at least one integrated circuit of claim 34, wherein said fourth module is configured for adjusting the tracking parameters based on the database.

36. A method for performing usage tracking, the method comprising:

receiving a notification identifying a targeted wireless terminal as being a target for tracking and one or more applications to be tracked;

transmitting at least one response to the received notification, the response identifying the targeted wireless terminal and indicating either an approval or a disapproval for tracking;

receiving tracking parameters that identify at least one upload window, each upload window indicting a unique time range for uploading tracking data to a server;

performing usage tracking according to the tracking parameters to produce a tracking log; and transmitting the tracking log during the time range indicated by at least one upload window.

37. The method of claim 36, wherein said receiving the tracking parameters comprises receiving the tracking parameters in at least one of a broadcast, multicast, and unicast transmission.

38. The method of claim 36, further comprising transmitting a notification response that indicates the opt-in or opt-out status.

39. The method of claim 36, further comprising manually submitting a notification response that indicates the opt-in or opt-out status.

40. The method of claim 36, wherein said receiving the notification comprises receiving the notification in at least one of a broadcast, multicast, and unicast transmission.

41. The method of claim 36, wherein said transmitting the tracking log comprises transmitting the tracking log with a terminal identifier.

42. The method of claim 36, wherein said performing comprises tracking one or more events associated with each of one or more applications, respectively, to produce the tracking log.

43. An apparatus for performing usage tracking, the apparatus comprising:

a memory; and a processor coupled to the memory, wherein the processor is configured with software instructions to perform operations comprising:

receiving a notification identifying a targeted wireless terminal as being a target for tracking and one or more applications to be tracked;

transmitting at least one response to the received notification, the response identifying the targeted wireless terminal and indicating either an approval or a disapproval for tracking;

receiving tracking parameters that identify at least one upload window, each upload window indicting a unique time range for uploading tracking data to a server;

processing usage tracking according to the tracking parameters to produce a tracking log; and transmitting the tracking log during the time range indicated by at least one upload window.

44. The apparatus of claim 43, wherein the processor is further configured with software instructions to receive the tracking parameters in at least one of a broadcast, multicast, and unicast transmission.

45. The apparatus of claim 43, wherein the processor is further configured with software instructions to transmit a notification response that indicates the opt-in or opt-out status.

46. The apparatus of claim 43, wherein the processor is further configured with software instructions to manually submitting a notification response that indicates the opt-in or opt-out status.

47. The apparatus of claim 43, wherein the processor is further configured with software instructions to receive the notification in at least one of a broadcast, multicast, and unicast transmission.

48. The apparatus of claim 43, wherein the processor is further configured with software instructions to transmit the tracking log with a terminal identifier.

49. The apparatus of claim 43, wherein the processor is further configured with software instructions to track one or more events associated with each of one or more applications, respectively, to produce the tracking log.

50. An apparatus for performing usage tracking, the apparatus comprising:

means for receiving a notification identifying a targeted wireless terminal as being a target for tracking and one or more applications to be tracked;

means for transmitting at least one response to the received notification, the response identifying the targeted wireless terminal and indicating either an approval or a disapproval for tracking;

means for receiving tracking parameters that identify at least one upload window, each upload window indicting a unique time range for uploading tracking data to a server;

means for performing usage tracking according to the tracking parameters to produce a tracking log; and means for transmitting the tracking log during the time range indicated by at least one upload window.

51. The apparatus of claim 50, wherein said means for receiving the tracking parameters comprises means for receiving the tracking parameters in at least one of a broadcast, multicast, and unicast transmission.

52. The apparatus of claim 50, further comprising means for transmitting a notification response that indicates the opt-in or opt-out status.

53. The apparatus of claim 50, further comprising means for manually submitting a notification response that indicates the opt-in or opt-out status.

54. The apparatus of claim 50, wherein said means for receiving the notification comprises means for receiving the notification in at least one of a broadcast, multicast, and unicast transmission.

55. The apparatus of claim 50, wherein said means for transmitting the tracking log comprises means for transmitting the tracking log with a terminal identifier.

56. The apparatus of claim 50, wherein said means for performing comprises means for tracking one or more events associated with each of one or more applications, respectively, to produce the tracking log.

57. A computer program product for providing usage tracking, comprising:

a machine-readable non-transitory storage medium comprising:

a first set of codes for receiving a notification identifying a targeted wireless terminal as being a target for tracking and one or more applications to be tracked;
a second set of codes for transmitting at least one response to the received notification, the response identifying the targeted wireless terminal and indicating either an approval or a disapproval for tracking;
a third set of codes for receiving tracking parameters that identify at least one upload window, each upload window indicting a unique time range for uploading tracking data to a server;
a fourth set of codes for performing usage tracking according to the tracking parameters to produce a tracking log; and
a fifth set of codes for transmitting the tracking log during the time range indicated by at least one upload window.

58. The machine-readable non-transitory storage medium of claim 57, wherein said third set of codes is configured to cause the computer to receive the tracking parameters in at least one of a broadcast, multicast, and unicast transmission.

59. The machine-readable non-transitory storage medium of claim 57, wherein said fifth set of codes is configured to cause the computer to transmit a notification response that indicates the opt-in or opt-out status.

60. The machine-readable non-transitory storage medium of claim 57, wherein said second set of codes is configured to cause the computer to manually submitting a notification response that indicates the opt-in or opt-out status.

61. The machine-readable non-transitory storage medium of claim 57, wherein said first set of codes is configured to cause the computer to receive the notification in at least one of a broadcast, multicast, and unicast transmission.

62. The machine-readable non-transitory storage medium of claim 57, wherein said fifth set of codes is configured to cause the computer to transmit the tracking log with a terminal identifier.

63. The machine-readable non-transitory storage medium of claim 57, wherein said fifth set of codes is configured to cause the computer to track one or more events associated with each of one or more applications, respectively, to produce the tracking log.

64. At least one integrated circuit configured to provide a method for usage tracking, the at least one integrated circuit comprising:
a first module configured for receiving a notification identifying a targeted wireless terminal as being a target for tracking and one or more applications to be tracked;
a second module configured for transmitting at least one response to the received notification, the response identifying the targeted wireless terminal and indicating either an approval or a disapproval for tracking;
a third module configured for receiving tracking parameters that identify at least one upload window, each upload window indicting a unique time range for uploading tracking data to a server;
a fourth module configured for performing usage tracking according to the tracking parameters to produce a tracking log; and
a fifth module configured for transmitting the tracking log during the time range indicated by at least one upload window.

65. The at least one integrated circuit of claim 64, wherein said third module is configured for receiving the tracking parameters in at least one of a broadcast, multicast, and unicast transmission.

66. The at least one integrated circuit of claim 64, wherein said second module is configured for transmitting a notification response that indicates the opt-in or opt-out status.

67. The at least one integrated circuit of claim 64, wherein said second module is configured for manually submitting a notification response that indicates the opt-in or opt-out status.

68. The at least one integrated circuit of claim 64, wherein said first module is configured for receiving the notification in at least one of a broadcast, multicast, and unicast transmission.

69. The at least one integrated circuit of claim 64, wherein said fifth module is configured for transmitting the tracking log with a terminal identifier.

70. The at least one integrated circuit of claim 64, wherein said fourth module is configured for tracking one or more events associated with each of one or more applications, respectively, to produce the tracking log.

71. A method for performing usage tracking, the method comprising:
transmitting a notification to a plurality of wireless terminals, the notification comprising an invitation to participate in the usage tracking;
receiving a response to the notification transmitted to the plurality of wireless terminals, the response identifying one of the plurality of wireless terminals and indicating that the one of the plurality of wireless terminals consents to the usage tracking;
transmitting tracking parameters to the one of the plurality of wireless terminals that consented to the usage tracking, the tracking parameters being indicative of a randomly determined time for uploading tracking data to a server; and
receiving the tracking data from the one of the plurality of wireless terminals at the randomly determined time, the received tracking data comprising a plurality of tracking information items collected by the one of the plurality of wireless terminals.

72. The method of claim 71, wherein the transmitting the tracking parameters further comprises transmitting the tracking parameters using at least one of a broadcast, a multicast, or a unicast transmission.

73. The method of claim 71, wherein the transmitting the notification further comprises transmitting the notification using at least one of a broadcast, a multicast, or a unicast transmission.

74. The method of claim 71, further comprising receiving a notification response that indicates whether a wireless terminal of the plurality of wireless terminals opts-in or opts-out of the usage tracking.

75. The method of claim 74, wherein the receiving the notification response further comprises receiving at least one manual notification.

76. The method of claim 71, further comprising:
mapping an identity of the one of the plurality of wireless terminals to a device identifier;
and storing the received tracking data and the device identifier in a database.

77. The method of claim 76, further comprising adjusting the tracking parameters based on the database.

78. The method of claim 71, wherein the notification comprises a sampling percentage that specifies a response range used by the plurality of wireless terminals to determine whether to respond to the notification.

79. An apparatus for performing usage tracking, the apparatus comprising:
a memory; and a processor coupled to the memory, wherein the processor is configured with software instructions to perform operations comprising:

transmitting a notification to a plurality of wireless terminals, the notification comprising an invitation to participate in the usage tracking;

receiving a response to the notification transmitted to the plurality of wireless terminals, the response identifying one of the plurality of wireless terminals and indicating that the one of the plurality of wireless terminals consents to the usage tracking;

transmitting tracking parameters to the one of the plurality of wireless terminals that consented to the usage tracking, the tracking parameters being indicative of a randomly determined time for uploading tracking data to a server; and receiving the tracking data from the one of the plurality of wireless terminals at the randomly determined time, the received tracking data comprising a plurality of tracking information items collected by the one of the plurality of wireless terminals.

80. The apparatus of claim 79, wherein the processor is further configured with software instructions to transmit the tracking parameters using at least one of a broadcast, a multicast, or a unicast transmission.

81. The apparatus of claim 79, wherein the processor is further configured with software instructions to transmit the notification using at least one of a broadcast, a multicast, or a unicast transmission.

82. The apparatus of claim 79, wherein the processor is further configured with software instructions to receive a notification response that indicates whether a wireless terminal of the plurality of wireless terminals opts-in or opts-out of the usage tracking 83. The apparatus of claim 82, wherein the processor is further configured with software instructions to receive at least one manual notification.

84. The apparatus of claim 79, wherein the processor is further configured with software instructions to:

map an identity of the one of the plurality of wireless terminals to a device identifier; and store the received tracking data and the device identifier in a database.

85. The apparatus of claim 84, wherein the processor is further configured with software instructions to adjust the tracking parameters based on the database.

86. The apparatus of claim 79, wherein the notification comprises a sampling percentage that specifies a response range used by the plurality of wireless terminals to determine whether to respond to the notification.

87. An apparatus for performing usage tracking, the apparatus comprising:

means for transmitting a notification to a plurality of wireless terminals, the notification comprising an invitation to participate in the usage tracking;

means for receiving a response to the notification transmitted to the plurality of wireless terminals, the response identifying one of the plurality of wireless terminals and indicating that the one of the plurality of wireless terminals consents to the usage tracking;

means for transmitting tracking parameters to the one of the plurality of wireless terminals that consented to the usage tracking, the tracking parameters being indicative of a randomly determined time for uploading tracking data to a server; and means for receiving the tracking data from the one of the plurality of wireless terminals at the randomly determined time, the received tracking data comprising a plurality of tracking information items collected by the one of the plurality of wireless terminals.

88. The apparatus of claim 87, wherein the means for transmitting the tracking parameters further comprises means for transmitting the tracking parameters using at least one of a broadcast, a multicast, or a unicast transmission.

89. The apparatus of claim 87, wherein the means for transmitting the notification further comprises means for transmitting the notification using at least one of a broadcast, a multicast, or a unicast transmission.

90. The apparatus of claim 87, further comprising means for receiving a notification response that indicates whether a wireless terminal of the plurality of wireless terminals opts-in or opts-out of the usage tracking 91. The apparatus of claim 90, wherein the means for receiving the notification response further comprises means for receiving at least one manual notification.

92. The apparatus of claim 87, further comprising:

means for mapping an identity of the one of the plurality of wireless terminals to a device identifier; and means for storing the received tracking data and the device identifier in a database.

93. The apparatus of claim 92, further comprising means for adjusting the tracking parameters based on the database.

94. The apparatus of claim 87, wherein the notification comprises a sampling percentage that specifies a response range used by the plurality of wireless terminals to determine whether to respond to the notification.

95. A machine-readable non-transitory storage medium comprising:

a first set of codes for causing a computer to transmit a notification to a plurality of wireless terminals, the notification comprising an invitation to participate in usage tracking;

a second set of codes for causing the computer to receive a response to the notification transmitted to the plurality of wireless terminals, the response identifying one of the plurality of wireless terminals and indicating that the one of the plurality of wireless terminals consents to the usage tracking;

a third set of codes for causing the computer to transmit tracking parameters to the one of the plurality of wireless terminals that consented to the usage tracking, the tracking parameters being indicative of a randomly determined time for uploading tracking data to a server; and a fourth set of codes for causing the computer to receive the tracking data from the one of the plurality of wireless terminals at the randomly determined time, the received tracking data comprising a plurality of tracking information items collected by the one of the plurality of wireless terminals.

96. The machine-readable non-transitory storage medium of claim 95, wherein said third set of codes is configured to cause the computer to transmit the tracking parameters using at least one of a broadcast, a multicast, or a unicast transmission.

97. The machine-readable non-transitory storage medium of claim 95, wherein said first set of codes is configured to cause the computer to transmit the notification using at least one of a broadcast, a multicast, or a unicast transmission.

98. The machine-readable non-transitory storage medium of claim 95, wherein said second set of codes is configured to cause the computer to receive a notification response that indicates whether a wireless terminal of the plurality of wireless terminals opts-in or opts-out of the usage tracking 99. The machine-readable non-transitory storage medium of claim 98, wherein said second set of codes is configured to cause the computer to receive at least one manual notification.

100. The machine-readable non-transitory storage medium of claim 95, wherein said fourth set of codes is configured to cause the computer to:
mapping an identity of the one of the plurality of wireless terminals to a device identifier;
and storing the received tracking data and the device identifier in a database.

101. The machine-readable non-transitory storage medium of claim 100, wherein said third set of codes is configured to cause the computer to adjust the tracking parameters based on the database.

102. The machine-readable non-transitory storage medium of claim 95, wherein the notification comprises a sampling percentage that specifies a response range used by the plurality of wireless terminals to determine whether to respond to the notification.

103. At least one integrated circuit configured to provide a method for usage tracking, the at least one integrated circuit comprising:
a first module configured for transmitting a notification to a plurality of wireless terminals, the notification comprising an invitation to participate in the usage tracking;
a second module configured for receiving a response to the notification transmitted to the plurality of wireless terminals, the response identifying one of the plurality of wireless terminals and indicating that the one of the plurality of wireless terminals consents to the usage tracking;
a third module configured for transmitting tracking parameters to the one of the plurality of wireless terminals that consented to the usage tracking, the tracking parameters being indicative of a randomly determined time for uploading tracking data to a server; and
a fourth module configured for receiving the tracking data from the one of the plurality of wireless terminals at the randomly determined time, the received tracking data comprising a plurality of tracking information items collected by the one of the plurality of wireless terminals.

104. The at least one integrated circuit of claim 103, wherein the third module is configured for transmitting the tracking parameters using at least one of a broadcast, a multicast, or a unicast transmission.

105. The at least one integrated circuit of claim 103, wherein the first module is configured for transmitting the notification using at least one of a broadcast, a multicast, or a unicast transmission.

106. The at least one integrated circuit of claim 103, wherein the second module is configured for receiving a notification response that indicates whether a wireless terminal of the plurality of wireless terminals opts-in or opts-out of the usage tracking 107. The at least one integrated circuit of claim 106, wherein the second module is configured for receiving at least one manual notification.

108. The at least one integrated circuit of claim 103, wherein the fourth module is configured for:
mapping an identity of the one of the plurality of wireless terminals to a device identifier; and
storing the received tracking data and the device identifier in a database.

109. The at least one integrated circuit of claim 108, wherein the third module is configured for adjusting the tracking parameters based on the database.

110. The at least one integrated circuit of claim 103, wherein the notification comprises a sampling percentage that specifies a response range used by the plurality of wireless terminals to determine whether to respond to the notification.

111. A method for performing usage tracking, the method comprising:
receiving a notification transmitted to a plurality of wireless terminals, the notification comprising an invitation to participate in the usage tracking;
transmitting at least one response to the received notification, the at least one response identifying one of the plurality of wireless terminals and indicating that the one of the plurality of wireless terminals consents to the usage tracking;
receiving tracking parameters transmitted to the one of the plurality of wireless terminals that consented to the usage tracking, the tracking parameters being indicative of a randomly determined time for uploading tracking data to a server;
performing the usage tracking according to the tracking parameters to produce a tracking log; and
transmitting the tracking log at the randomly determined time, the transmitted tracking log comprising a plurality of tracking information items collected by the one of the plurality of wireless terminals.

112. The method of claim 111, wherein receiving the tracking parameters comprises receiving the tracking parameters in at least one of a broadcast, multicast, and unicast transmission.

113. The method of claim 111, further comprising transmitting a notification response that indicates an opt-in or opt-out status.

114. The method of claim 111, further comprising manually submitting a notification response that indicates an opt-in or opt-out status.

115. The method of claim 111, wherein receiving the notification comprises receiving the notification in at least one of a broadcast, multicast, and unicast transmission.

116. The method of claim 111, wherein transmitting the tracking log comprises transmitting the tracking log with a terminal identifier.

117. The method of claim 111, wherein the performing comprises tracking one or more events associated with each of one or more applications, respectively, to produce the tracking log.

118. An apparatus for performing usage tracking, the apparatus comprising:
a memory; and
a processor coupled to the memory, wherein the processor is configured with software instructions to perform operations comprising:
receiving a notification transmitted to a plurality of wireless terminals, the notification comprising an invitation to participate in the usage tracking;
transmitting at least one response to the received notification, the at least one response identifying one of the plurality of wireless terminals and indicating that the one of the plurality of wireless terminals consents to the usage tracking;
receiving tracking parameters transmitted to the one of the plurality of wireless terminals that consented to the usage tracking, the tracking parameters being indicative of a randomly determined time for uploading tracking data to a server;
performing the usage tracking according to the tracking parameters to produce a tracking log; and transmitting the tracking log at the randomly determined time, the transmitted tracking log comprising a plurality of tracking information items collected by the one of the plurality of wireless terminals.

119. The apparatus of claim 118, wherein the processor is further configured with software instructions to receive the tracking parameters in at least one of a broadcast, multicast, and unicast transmission.

120. The apparatus of claim 118, wherein the processor is further configured with software instructions to transmit a notification response that indicates an opt-in or opt-out status.

121. The apparatus of claim 118, wherein the processor is further configured with software instructions to manually submitting a notification response that indicates an opt-in or opt-out status.

122. The apparatus of claim 118, wherein the processor is further configured with software instructions to receive the notification in at least one of a broadcast, multicast, and unicast transmission.

123. The apparatus of claim 118, wherein the processor is further configured with software instructions to transmit the tracking log with a terminal identifier.

124. The apparatus of claim 118, wherein the processor is further configured with software instructions to track one or more events associated with each of one or more applications, respectively, to produce the tracking log.

125. An apparatus for performing usage tracking, the apparatus comprising:
  means for receiving a notification transmitted to a plurality of wireless terminals, the notification comprising an invitation to participate in the usage tracking;
  means for transmitting at least one response to the received notification, the at least one response identifying one of the plurality of wireless terminals and indicating that the one of the plurality of wireless terminals consents to the usage tracking;
  means for receiving tracking parameters transmitted to the one of the plurality of wireless terminals that consented to the usage tracking, the tracking parameters being indicative of a randomly determined time for uploading tracking data to a server;
  means for performing the usage tracking according to the tracking parameters to produce a tracking log; and
  means for transmitting the tracking log at the randomly determined time, the transmitted tracking log comprising a plurality of tracking information items collected by the one of the plurality of wireless terminals.

126. The apparatus of claim 125, wherein the means for receiving the tracking parameters comprises means for receiving the tracking parameters in at least one of a broadcast, multicast, and unicast transmission.

127. The apparatus of claim 125, further comprising means for transmitting a notification response that indicates an opt-in or opt-out status.

128. The apparatus of claim 125, further comprising means for manually submitting a notification response that indicates an opt-in or opt-out status.

129. The apparatus of claim 125, wherein the means for receiving the notification comprises means for receiving the notification in at least one of a broadcast, multicast, and unicast transmission.

130. The apparatus of claim 125, wherein the means for transmitting the tracking log comprises means for transmitting the tracking log with a terminal identifier.

131. The apparatus of claim 125, wherein the means for performing comprises means for tracking one or more events associated with each of one or more applications, respectively, to produce the tracking log.

132. A machine-readable non-transitory storage medium comprising:
  a first set of codes for causing a computer to receive a notification transmitted to a plurality of wireless terminals, the notification comprising an invitation to participate in usage tracking;
  a second set of codes for causing the computer to transmit at least one response to the received notification, the at least one response identifying one of the plurality of wireless terminals and indicating that the one of the plurality of wireless terminals consents to the usage tracking;
  a third set of codes for causing the computer to receive tracking parameters transmitted to the one of the plurality of wireless terminals that consented to the usage tracking, the tracking parameters being indicative of a randomly determined time for uploading tracking data to a server;
  a fourth set of codes for causing the computer to perform the usage tracking according to the tracking parameters to produce a tracking log; and
  a fifth set of codes for causing the computer to transmit the tracking log at the randomly determined time, the transmitted tracking log comprising a plurality of tracking information items collected by the one of the plurality of wireless terminals.

133. The machine-readable non-transitory storage medium of claim 132, wherein the third set of codes is configured to cause the computer to receive the tracking parameters in at least one of a broadcast, multicast, and unicast transmission.

134. The machine-readable non-transitory storage medium of claim 132, wherein the fifth set of codes is configured to cause the computer to transmit a notification response that indicates an opt-in or opt-out status.

135. The machine-readable non-transitory storage medium of claim 132, wherein the second set of codes is configured to cause the computer to manually submit a notification response that indicates an opt-in or opt-out status.

136. The machine-readable non-transitory storage medium of claim 132, wherein the first set of codes is configured to cause the computer to receive the notification in at least one of a broadcast, multicast, and unicast transmission.

137. The machine-readable non-transitory storage medium of claim 132, wherein the fifth set of codes is configured to cause the computer to transmit the tracking log with a terminal identifier.

138. The machine-readable non-transitory storage medium of claim 132, wherein the fifth set of codes is configured to cause the computer to track one or more events associated with each of one or more applications, respectively, to produce the tracking log.

139. At least one integrated circuit configured to provide a method for usage tracking, the at least one integrated circuit comprising:
  a first module configured for receiving a notification transmitted to a plurality of wireless terminals, the notification comprising an invitation to participate in the usage tracking;
  a second module configured for transmitting at least one response to the received notification, the at least one response identifying one of the plurality of wireless terminals and indicating that the one of the plurality of wireless terminals consents to the usage tracking;
  a third module configured for receiving tracking parameters transmitted to the one of the plurality of wireless terminals that consented to the usage tracking, the tracking parameters being indicative of a randomly determined time for uploading tracking data to a server;

a fourth module configured for performing the usage tracking according to the tracking parameters to produce a tracking log; and a fifth module configured for transmitting the tracking log at the randomly determined time, the transmitted tracking log comprising a plurality of tracking information items collected by the one of the plurality of wireless terminals.

140. The at least one integrated circuit of claim 139, wherein the third module is configured for receiving the tracking parameters in at least one of a broadcast, multicast, and unicast transmission.

141. The at least one integrated circuit of claim 139, wherein the second module is configured for transmitting a notification response that indicates an opt-in or opt-out status.

142. The at least one integrated circuit of claim 139, wherein the second module is configured for manually submitting a notification response that indicates an opt-in or opt-out status.

143. The at least one integrated circuit of claim 139, wherein the first module is configured for receiving the notification in at least one of a broadcast, multicast, and unicast transmission.

144. The at least one integrated circuit of claim 139, wherein the fifth module is configured for transmitting the tracking log with a terminal identifier.

145. The at least one integrated circuit of claim 139, wherein the fourth module is configured for tracking one or more events associated with each of one or more applications, respectively, to produce the tracking log.

* * * * *